United States Patent
Yasuda

(10) Patent No.: US 8,953,089 B2
(45) Date of Patent: Feb. 10, 2015

(54) IMAGING APPARATUS AND CONTROLLING METHOD THEREFOR, AND LENS UNIT AND CONTROLLING METHOD THEREFOR, AND IMAGING SYSTEM

(71) Applicant: Canon Kabushiki Kaisha, Tokyo (JP)

(72) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 13/729,990

(22) Filed: Dec. 28, 2012

(65) Prior Publication Data

US 2013/0182140 A1 Jul. 18, 2013

(30) Foreign Application Priority Data

Jan. 13, 2012 (JP) ................................ 2012-004560
Oct. 29, 2012 (JP) ................................ 2012-238265

(51) Int. Cl.
*H04N 5/225* (2006.01)
*H04N 5/232* (2006.01)

(52) U.S. Cl.
CPC ................................ *H04N 5/23212* (2013.01)
USPC ........... 348/345; 348/346; 348/351; 348/353; 348/354; 348/356

(58) Field of Classification Search
CPC .................................................. H04N 5/23212
See application file for complete search history.

(56) References Cited

U.S. PATENT DOCUMENTS

| | | | |
|---|---|---|---|
| 8,326,139 B2 | 12/2012 | Shibuno et al. | |
| 2002/0047912 A1* | 4/2002 | Mabuchi et al. | 348/345 |
| 2009/0073304 A1* | 3/2009 | Kumagai et al. | 348/345 |
| 2010/0060781 A1* | 3/2010 | Yumiki et al. | 348/345 |
| 2010/0194966 A1* | 8/2010 | Abe | 348/345 |
| 2010/0238321 A1* | 9/2010 | Honjo et al. | 348/231.99 |
| 2011/0279727 A1* | 11/2011 | Kusaka | 348/340 |
| 2012/0076482 A1* | 3/2012 | Shibuno et al. | 396/125 |
| 2012/0081594 A1* | 4/2012 | Makigaki | 348/340 |
| 2013/0113977 A1* | 5/2013 | Yumiki | 348/333.08 |
| 2013/0163105 A1* | 6/2013 | Yumiki | 359/823 |
| 2013/0235470 A1* | 9/2013 | Yumiki et al. | 359/696 |

FOREIGN PATENT DOCUMENTS

JP 2008-242442 10/2008

* cited by examiner

*Primary Examiner* — Aung S Moe
*Assistant Examiner* — John H Morehead, III
(74) *Attorney, Agent, or Firm* — Cowan, Liebowitz & Latman, P.C.

(57) ABSTRACT

In a camera unit that is mountable to a lens unit having a focus lens, an AF signal processing unit generates an AF evaluation value from an imaging signal obtained by an imaging element, and a camera control unit generates drive information for moving the focus lens to an in-focus point using the AF evaluation value and transmits the drive information to the mounted lens unit. The camera control unit transmits drive information including a focus lens position served as a reference for micro vibration and an amount of movement of the focus lens indicated by shift amount of an image plane with reference to the focus lens position to a lens unit.

18 Claims, 18 Drawing Sheets

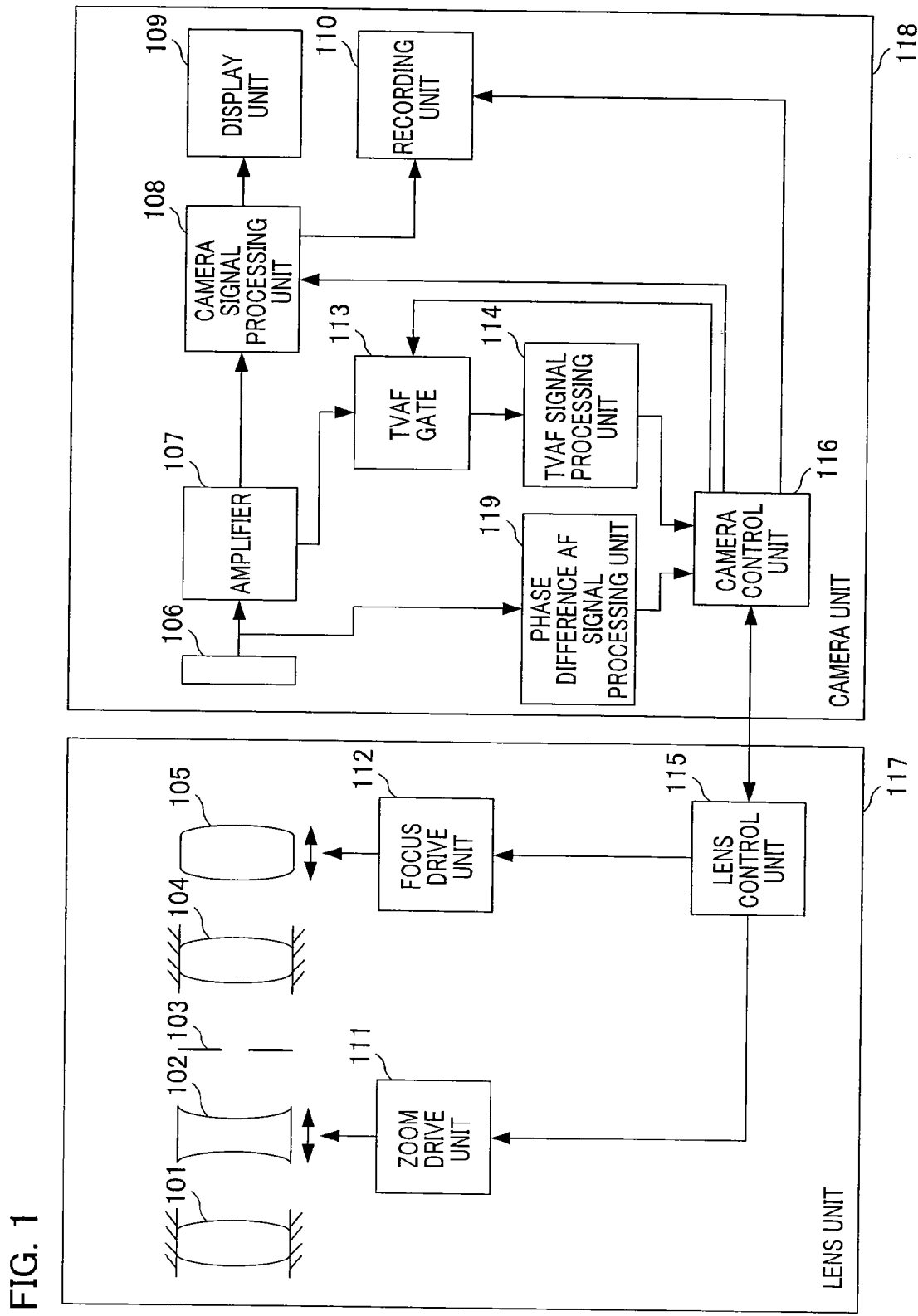

SENSITIVITY =
RATIO BETWEEN LENS DRIVE AMOUNT
AND IMAGE PLANE SHIFT AMOUNT

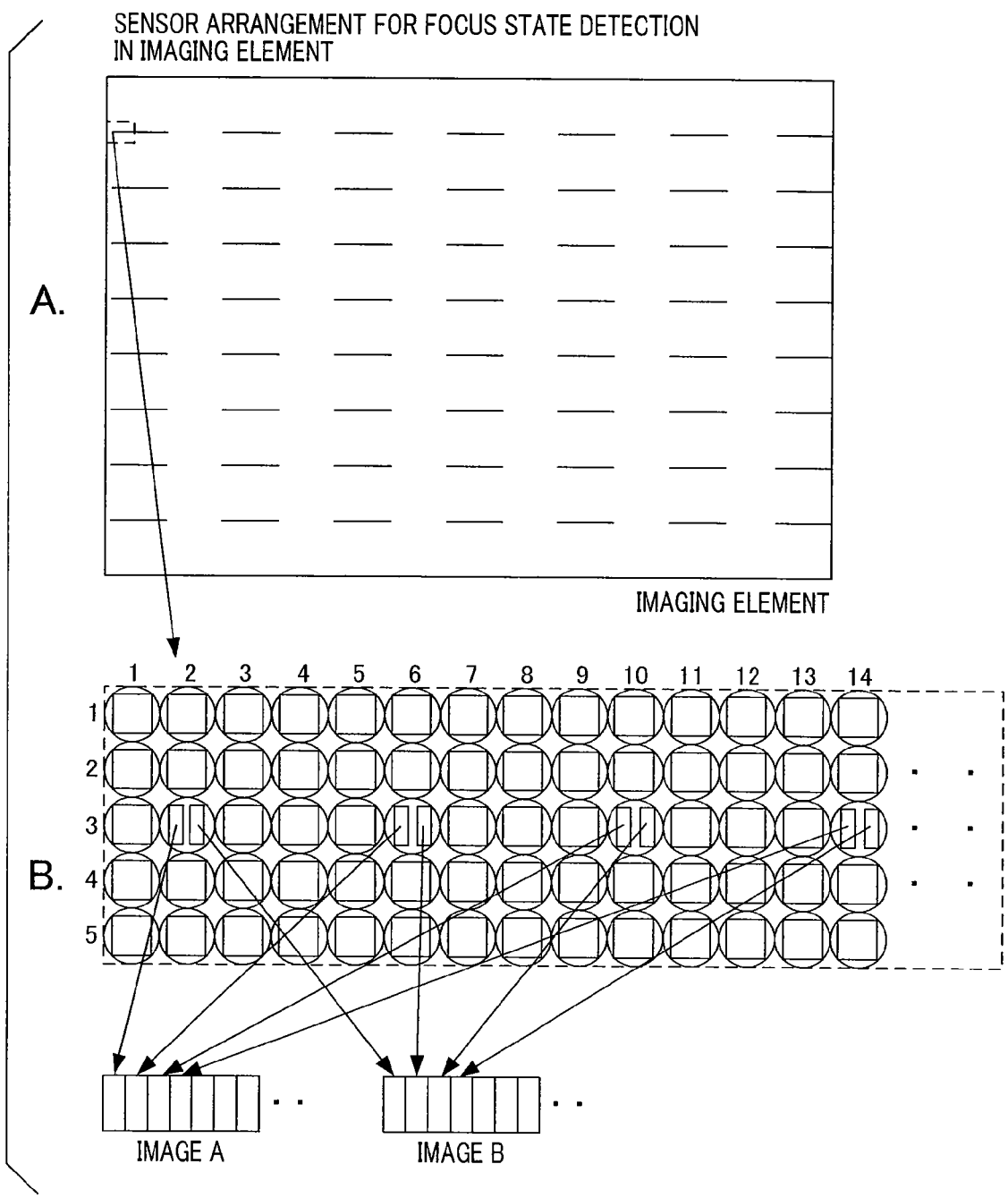

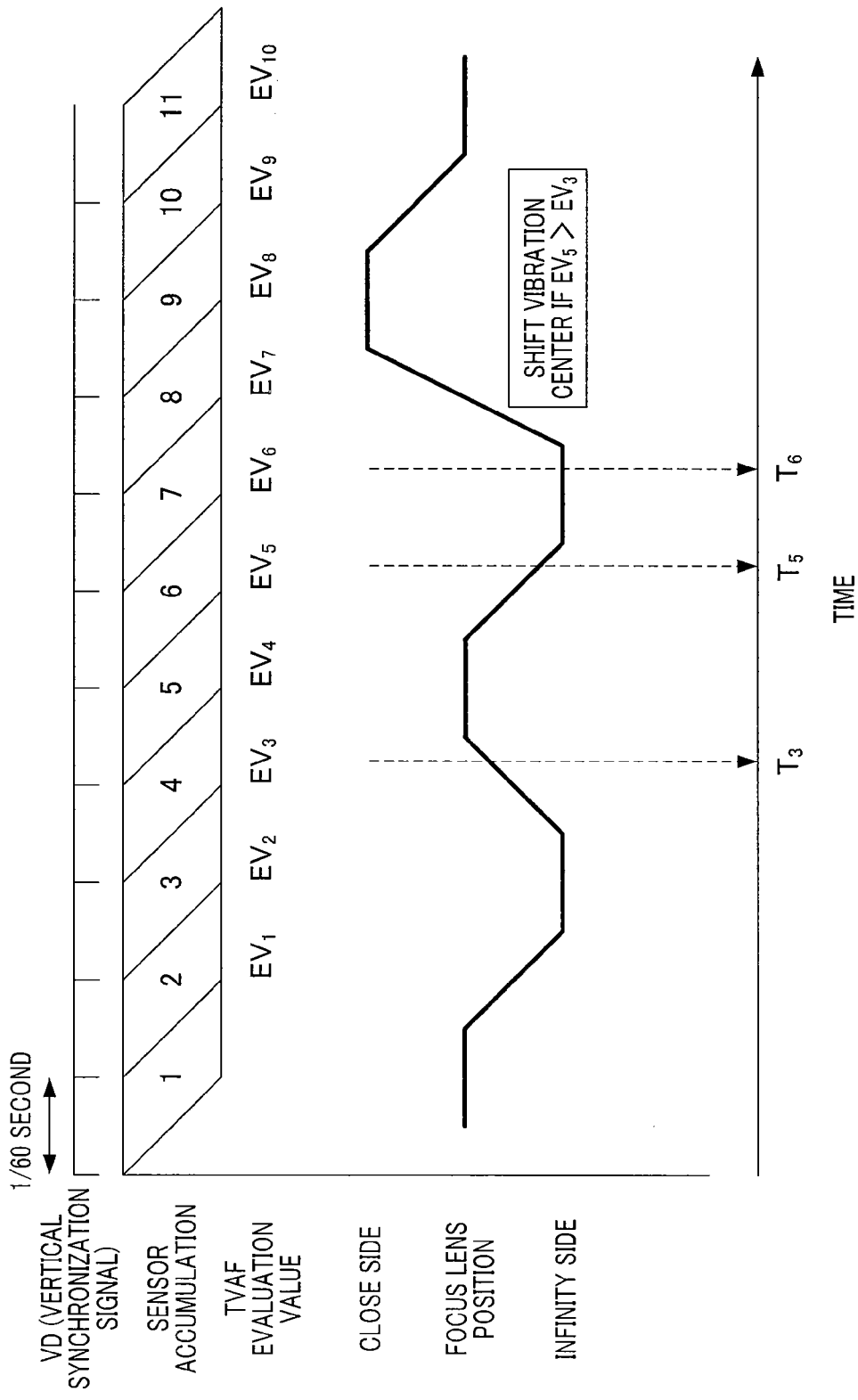

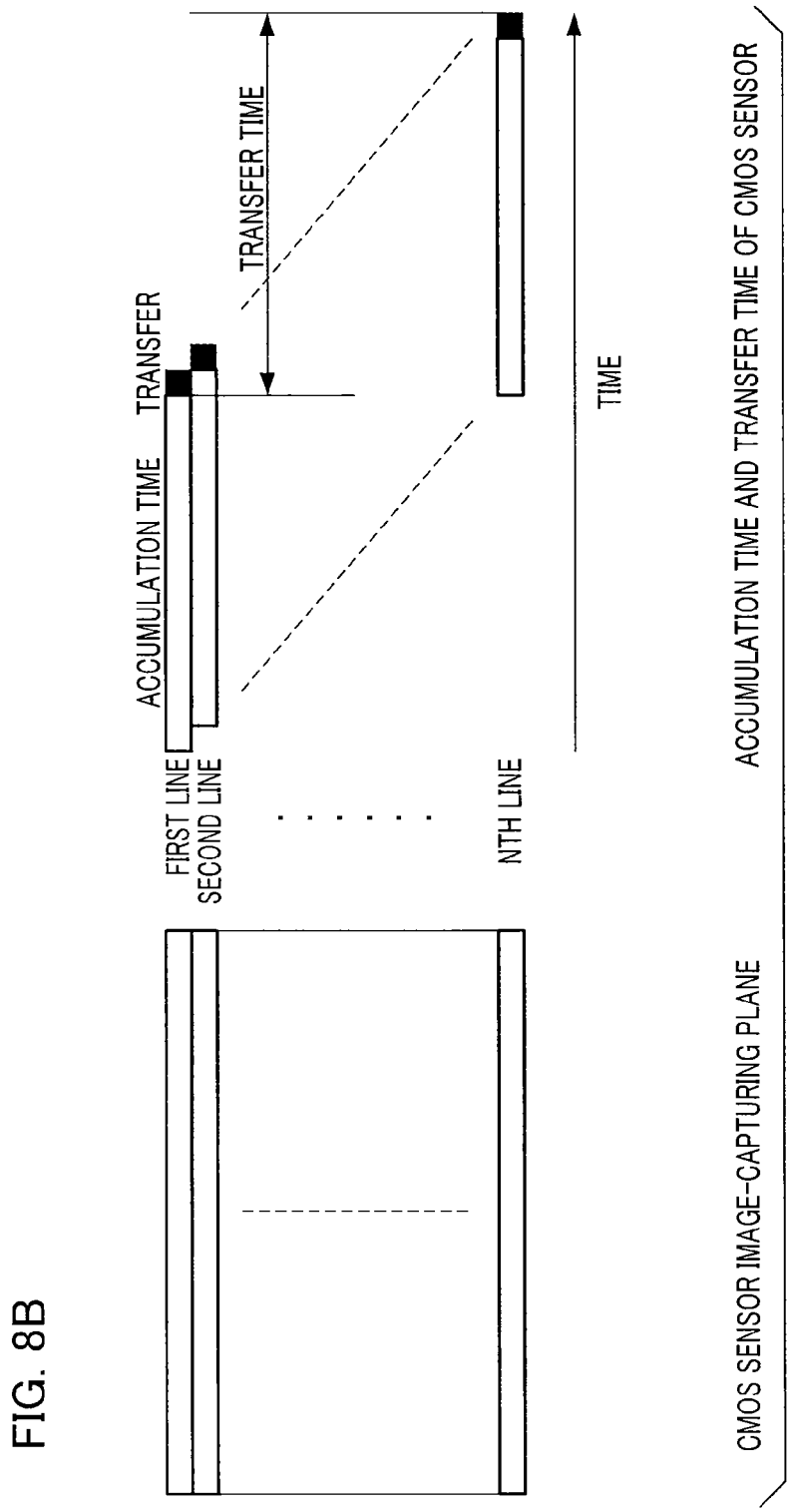

| CAMERA TO LENS COMMUNICATION | |
|---|---|
| WORD 1 | REFERENCE POSITION $\alpha$ |
| WORD 2 | AMPLITUDE $\beta$ |
| WORD 3 | REFERENCE POSITION SHIFT AMOUNT $\gamma$ |

| LENS TO CAMERA COMMUNICATION | |
|---|---|
| WORD 1 | FOCUS LENS POSITION |
| WORD 2 | NEW REFERENCE POSITION |

FIG. 17

IMAGING APPARATUS AND CONTROLLING METHOD THEREFOR, AND LENS UNIT AND CONTROLLING METHOD THEREFOR, AND IMAGING SYSTEM

BACKGROUND OF THE INVENTION

1. Field of the Invention

The present invention relates to the automatic focus adjustment of a lens unit and an imaging apparatus that is mountable to the lens unit.

2. Description of the Related Art

In recent years, AF (auto focus) devices for cameras that determine an AF evaluation value by detecting the sharpness of an image from an imaging signal and shift a focus lens to a position where the AF evaluation value is the highest to thereby perform focus adjustment have been prevailing. Hereinafter, the above method is referred to as the "TVAF method". As an AF evaluation value, the high frequency component level of an image signal extracted by a band pass filter with a predetermined band is typically used. When an object is captured, an AF evaluation value increases as the focus lens is being focused and is maximized at an in-focus point as shown in FIG. 2A. In other words, in the example, the degree of focusing decreases with distance from the in-focus position. FIG. 2B shows an operation (hereinafter referred to as "wobbling operation") for determining a focusing direction based on the change in the AF evaluation value obtained when the focus lens is driven at micro intervals. In the wobbling operation, the influence of the movement of the lens on a capturing screen is not noticeable, and thus, the wobbling operation is used particularly for capturing moving images. On the other hand, the drive amount of the focus lens and the image plane shift amount are not always the same as shown in FIG. 2C, the ratio (sensitivity) between both amounts is different for each lens unit and may vary depending on the positions of the focus lens and the zoom lens.

Japanese Patent Laid-Open No. 2008-242442 discloses an automatic focus adjustment device for adapting the AF method of this type to a video camera having an interchangeable lens unit. The wobbling operation is enabled by an interchangeable lens system by passing a wobbling operation signal to the lens unit and thus causing the lens unit to perform wobbling operation control.

However, in the case of controlling the focus lens by use of a conventional interchangeable lens system, it is difficult for a camera body to change the movement of the focus lens when the improvement in wobbling operation is desired in the future. Also, it is an undesirable necessity that different drive commands be prepared when it is desired that a camera realize the drive control of the focus lens for each lens unit, resulting in a complication of control. As described above, the image plane shift amount relative to the drive amount of the focus lens is different for each lens unit and may also vary depending on a focus lens position and a zoom lens position. For this reason, even if the control unit provided in the camera body of the interchangeable lens system can provide an instruction about a desired image plane shift amount to the lens unit, the control unit is unaware of the actual drive amount of the focus lens relative to the image plane shift amount. In other words, it is difficult for the control unit of the camera body to acquire detailed information about lens configuration, lens specification, and the like in order to provide an instruction about a specific drive amount of the focus lens to the lens unit.

SUMMARY OF THE INVENTION

The present invention provides an interchangeable lens system that an imaging apparatus transmits integrated information of a focus lens to a lens apparatus so as to control the various shifts of the focus lens including a wobbling operation.

According to an aspect of the present invention, an imaging apparatus is provided that is mountable to a lens unit provided with an imaging optical system including a focus lens. The imaging apparatus includes an imaging unit configured to generate an imaging signal by photoelectrically converting an object image; a signal processing unit configured to generate an evaluation signal for focus adjustment using the imaging signal; and a control unit configured to generate drive information about a focus lens based on the evaluation signal and to transmit the drive information to the lens unit when mounted. When micro vibration of the focus lens is performed, the control unit is configured to transmit to the lens unit first information about the position of the focus lens serve as a reference for micro vibration and second information about an amount of movement of the focus lens indicated as a shift amount of an image plane with reference to the position of the focus lens when the first information was transmitted, as drive information about the focus lens.

According to the present invention, an imaging apparatus that transmits drive information including information about the shift amount of an image plane from the imaging apparatus body to a lens unit so as to control the movement of the focus lens may be provided.

Further features of the present invention will become apparent from the following description of exemplary embodiments with reference to the attached drawings.

BRIEF DESCRIPTION OF THE DRAWINGS

FIG. 1 is a block diagram illustrating an example of the configuration of an imaging system including a lens unit and an imaging apparatus in order to describe embodiments of the present invention in conjunction with FIGS. 2 to 17.

FIG. 3 is an explanatory diagram illustrating a phase difference AF-enabled imaging element on an image capturing plane.

FIG. 8A is a diagram illustrating micro-driving.

FIG. 8B is a diagram illustrating an accumulation timing of an imaging element.

FIG. 17 is a pixel layout diagram illustrating an arrangement of image capturing pixels and focus detection pixels.

DESCRIPTION OF THE EMBODIMENTS

Figure 2A:
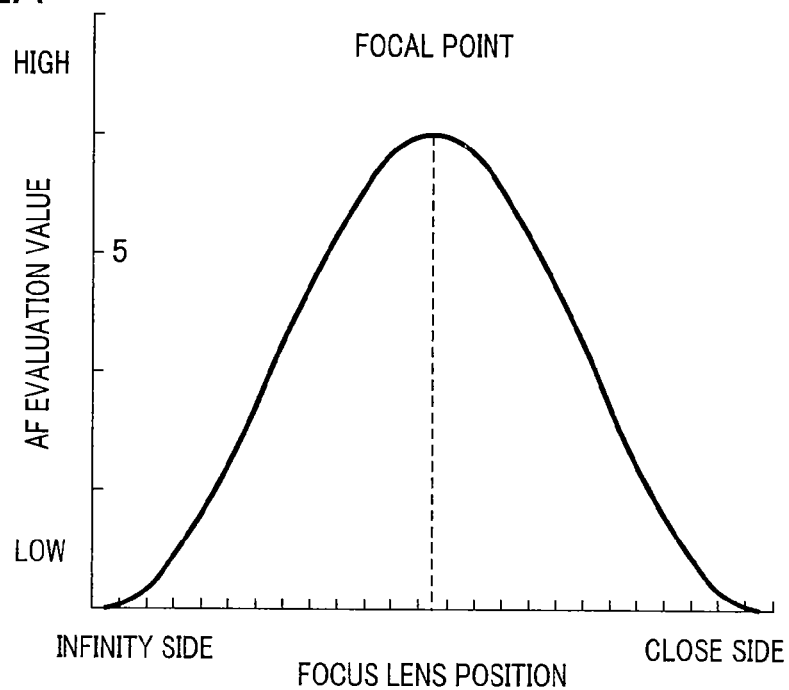
FIG. 2A is a diagram illustrating a TVAF signal.

Hereinafter, preferred embodiments of the present invention will be described with reference to the drawings. FIG. 1 is a block diagram illustrating an example of the configuration of an imaging system including a lens unit and an imaging apparatus according to an embodiment of the present invention. The imaging apparatus includes a mountable lens unit 117 and a camera unit 118 served as a body which is used by being mounted with the lens unit 117. In other words, the lens unit 117 is mountable on the camera unit 118 and a so-called interchangeable lens system is constituted.

Light reflected from an object passes through an imaging optical system consisting of a fixed first group lens 101, a movable second lens group 102, an aperture 103, a fixed third lens group 104, and a movable fourth lens group 105, all of which are provided in the lens unit 117, to thereby be focused on an imaging element 106 provided within the camera unit 118. The second lens group 102 performs a zooming operation. The fourth lens group (hereinafter referred to as "focus lens") 105 includes both a focus adjustment function and a compensation function for compensating the shift of a focal plane due to the zooming operation.

Figure 15A:
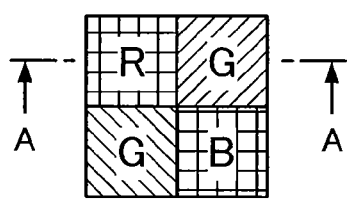
FIG. 15A is a plan view illustrating an image capturing pixel of an imaging element.

The imaging element 106 is a photoelectric conversion element constituted by a CMOS (Complementary Metal Oxide Semiconductor) image sensor or the like and generates an imaging signal by photoelectrically converting an object image. The imaging signal photoelectrically converted by the imaging element 106 is amplified to an optimum level by an amplifier 107, and then is output to a camera signal processing unit 108. Hereinafter, a description will be given of an exemplary configuration of the imaging element 106 with reference to FIGS. 15 to 17. FIG. 15A and FIG. 16A are diagrams illustrating the structures of an image capturing pixel and a focus detection pixel included in the imaging element 106. In the present embodiment, focus detection pixels having a structure to be described below are distributed and arranged in an image capturing pixel group of the Bayer array in accordance with a predetermined rule.

Figure 15B:
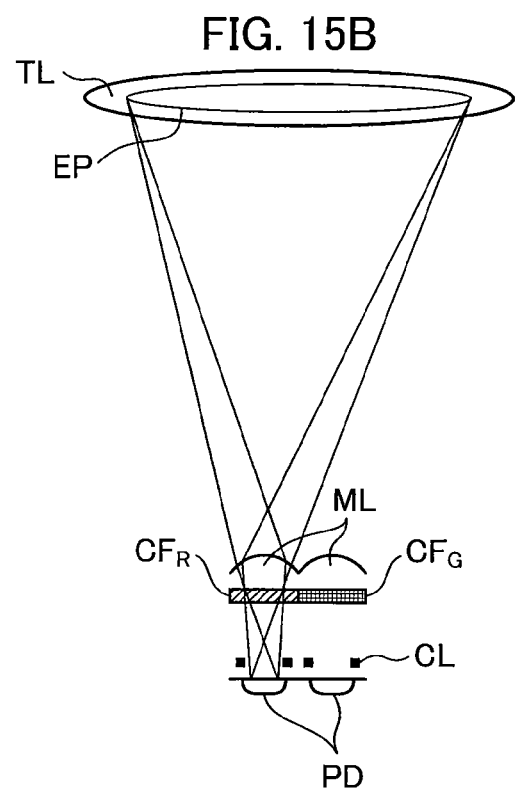
FIG. 15B is a cross-sectional view illustrating an image capturing pixel of an imaging element.
Figure 16A:
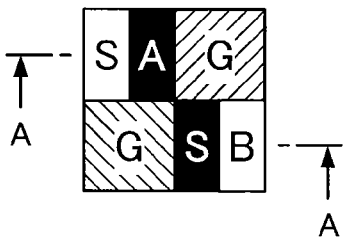
FIG. 16A is a plan view illustrating a focus detection pixel of an imaging element.

FIG. 15A and FIG. 15B show an example of the arrangement and structure of the image capturing pixel. FIG. 15A is a plan view illustrating 2 by 2 image capturing pixels. As is generally known, in the Bayer array, a plurality of G (green) pixels are diagonally arranged, and an R (red) pixel and a B (blue) pixel are arranged as the two remaining pixels. This 2 by 2 structure is repeatedly arranged in a two-dimensional array.

FIG. 15B is a cut-away cross-sectional view taken along the line A-A of the image capturing pixel shown in FIG. 15A. An on-chip microlens ML is arranged in the front-most surface of each pixel, and an R (Red) color filter $CF_R$ and a G (Green) color filter $CF_G$ are arranged on back of the on-chip microlens ML. Reference symbol PD (PhotoDiode) denotes a schematic photoelectric conversion unit of the imaging element 106. A signal line for transmitting various signals within the CMOS image sensor is formed in a wiring layer CL (Contact Layer). An imaging optical system TL (Taking Lens) and its exit pupil EP (Exit Pupil) are schematically shown. The on-chip microlens ML and photoelectric conversion unit PD of the image capturing pixel are configured to capture a light flux having passed through the imaging optical system TL as effectively as possible. A signal generated by the image capturing pixel is output to the camera signal processing unit 108. FIG. 15B shows only the incident beam of the R pixel, but the G pixel and the B pixel also have the same structure.

Figure 16B:
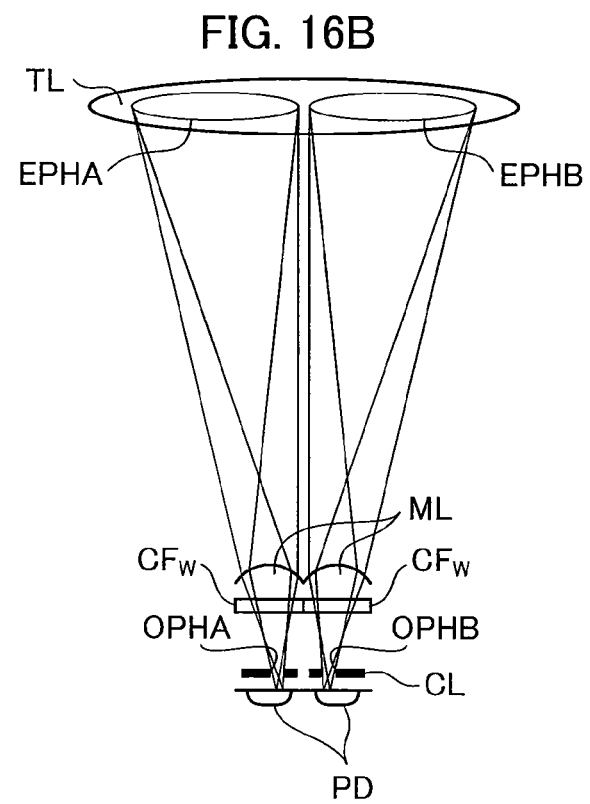
FIG. 16B is a cross-sectional view illustrating a focus detection pixel of an imaging element.

FIG. 16A and FIG. 16B show an example of the arrangement and structure of focus detection pixels for carrying out pupil splitting in the horizontal direction of the imaging optical system. By performing pupil splitting in the horizontal direction, the focus of an object, e.g., a vertical line having a luminance distribution in the horizontal direction can be detected. The horizontal direction is defined as a direction along a straight line perpendicular to the optical axis and the vertical axis when the user or photographer holds the camera in the state in which the optical axis of the imaging optical system is horizontal. The vertical direction is defined as a direction perpendicular to the defined horizontal direction.

In the present embodiment, from among light transmitted through different regions of the exit pupil of the imaging optical system, a part of light is shielded and remaining non-shielded light is received by focus detection pixels. FIG. 16A is a plan view illustrating 2 by 2 pixels including focus detection pixels. When obtaining an imaging signal, the main component of luminance information is acquired by a G pixel. The image recognition feature of a person is sensitive to luminance information. Thus, if a G pixel is lost, degradation of the image quality is readily perceived. On the other hand, an R pixel or a B pixel is used to acquire color information (color difference information), but the visual feature of a person is not sensitive to color information as compared with luminance information. Hence, if only a few pixels for acquiring color information are lost, degradation of the image quality is hardly recognized. Thus, in the present embodiment, among the 2 by 2 pixels, the G pixels are left to serve as image capturing pixels, and the R and B pixels are replaced with focus detection pixels SA and SB.

FIG. 16B is a cut-away cross-sectional view taken along the line A-A shown in FIG. 16A. The microlens ML and the photoelectric conversion element PD have the same structures as those of the image capturing pixel shown in FIG. 15B. In the present embodiment, a signal obtained from the focus detection pixel is not used to generate an image, and thus, a transparent film $CF_W$ (white) is arranged in place of the color filter for separating color. To carry out pupil splitting using a photoelectric conversion unit as a unit, the opening of the wiring layer CL is offset in one direction from the center line of the microlens ML. More specifically, the opening OPHA of the focus detection pixel SA is offset in the horizontal direction (to the right side in FIG. 16) and receives a light flux having passed through the left side of the exit pupil EPHA of the imaging optical system TL. The opening OPHB of the focus detection pixel SB is offset to the left in a direction opposite to that of the pixel SA and receives a light flux having passed through the right side of the exit pupil EPHB of the imaging optical system TL. The focus detection pixels SA having the above configuration are arrayed regularly in the horizontal direction, and an object image obtained by these pixel groups is defined as an image A. The focus detection pixels SB are also arrayed regularly in the horizontal direction, and an object image obtained by these pixel groups is defined as an image B. The signals for the image A and the image B are output to a phase difference AF signal processing unit 119 (see FIG. 1). The phase difference AF signal processing unit 119 detects the defocus amount of an image plane of the object image by detecting the relative position (phase difference) of the images A and B. The detection result is output to a camera control unit to be described below.

When the defocus amount of an object, e.g., a horizontal line having a luminance distribution in the vertical direction is detected, the configuration shown in FIG. 16B is rotated through 90 degrees such that the opening OPHA of the pixel SA is offset downward and the opening OPHB of the pixel SB is offset upward. Alternatively, the opening OPHA of the pixel SA may be offset upward and the opening OPHB of the pixel SB may be offset downward.

Figure 17:
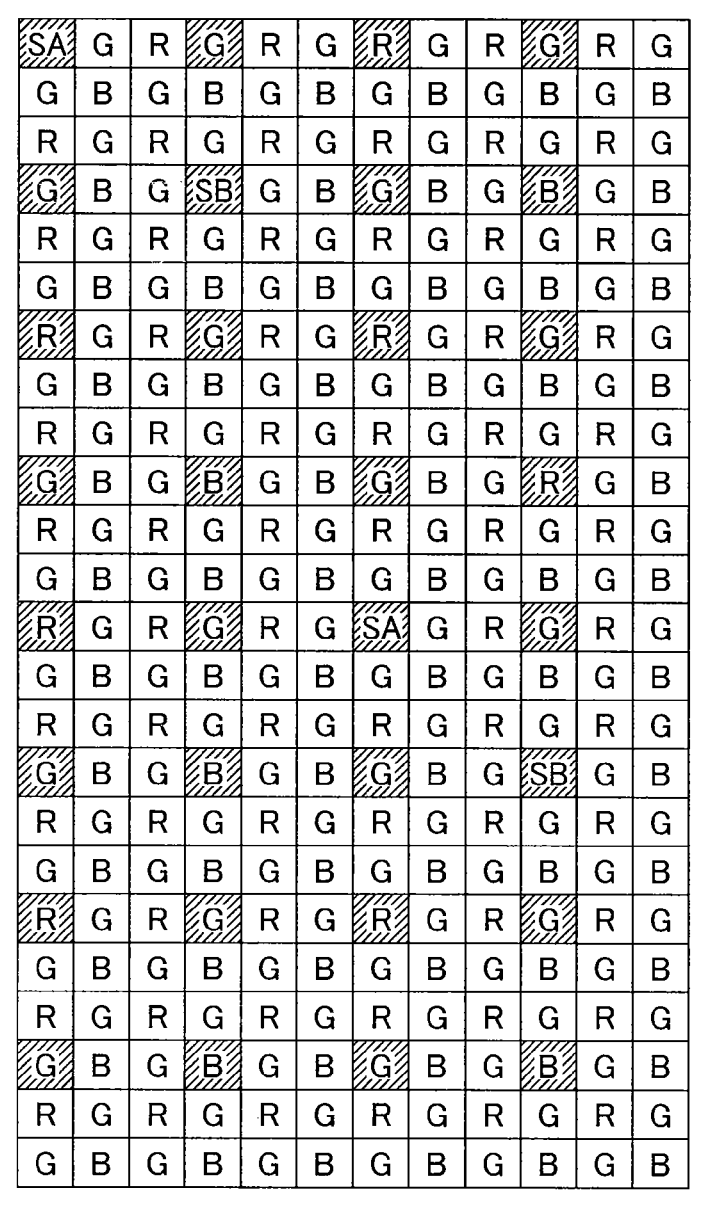

FIG. 17 shows an example of the arrangement of the image capturing pixels SA and the focus detection pixels SB described with reference to FIG. 15A, FIG. 15B, FIG. 16A, and FIG. 16B. In consideration of the fact that the focus detection pixels cannot be used for the image capturing pixels, in the present embodiment, the focus detection pixels are discretely arranged at predetermined intervals along the horizontal direction and the vertical direction. Also, the focus detection pixels are not arranged at positions of the G pixels so as to make image degradation less apparent. In the present embodiment, as shown in FIG. 17, two pairs of the pixels SA and the pixels SB are arranged within a block consisting of 12 by 24 pixels so as to complete the pixel arrangement pattern in one block.

As the configuration of the imaging element 106 that is capable of performing AF (auto focus) using a phase difference detection method, a pixel may also be divided into two pixels in one microlens as shown in FIG. 3A and FIG. 3B. FIG. 3A shows an example of the sensor arrangement for focus state detection provided in the imaging element 106 and FIG. 3B shows an enlarged portion of the sensor arrangement shown in FIG. 3A. Each microlens is represented by a circular frame and each sensor for each pixel is represented by a rectangular frame. In a location (e.g., see second row in third column) where a pixel is divided into two pixels at the left and right sides with respect to one microlens, the outputs of these pixels are added and the resulting output is output to the camera signal processing unit 108 (see FIG. 1). On the other hand, the output of a pixel at the left side and the output of a pixel at the right side are independently output to the phase difference AF signal processing unit 119. Among the paired sensors shown in FIG. 3B, an image A is formed by a left side sensor group and an image B is formed by a right side sensor group. The phase difference AF signal processing unit 119 determines the defocus amount of an image plane from the phase difference between the paired left and right image signals.

The camera signal processing unit 108 applies various image processing to an output signal obtained from the amplifier 107 to thereby generate an image. A display unit 109 is constituted by a liquid crystal display device (LCD) or the like and displays an image in accordance with an image obtained from the camera signal processing unit 108. A recording unit 110 records an image obtained from the camera signal processing unit 108 in a recording medium such as a semiconductor memory or the like. A TVAF gate 113 serves to pass a signal in a region for use in focus detection only from among the output signals of all pixels obtained from the amplifier 107. A TVAF signal processing unit 114 extracts a high frequency component from the signals passed through the TVAF gate 113 and generates a TVAF evaluation value signal (evaluation signal) to thereby output the generated TVAF evaluation value signal to a camera control unit 116. The TVAF evaluation value signal represents the sharpness (contrast state) of an image generated on the basis of the image signal obtained from the imaging element 106. Since sharpness may vary depending on the focus state of an imaging optical system, the value (AF evaluation value) indicated by the TVAF evaluation value signal is focus adjustment information indicating the focus state of the imaging optical system. FIG. 2A is a graph illustrating an example of the relationship between a focus lens position and an AF evaluation value where focus lens position is plotted on the horizontal axis and AF evaluation value is plotted on the vertical axis. The peak position of the focus lens 105 when the AF evaluation value reaches its peak value (extreme value) corresponds to the in-focus point.

As described above, the phase difference AF signal processing unit 119 calculates the defocus amount (image plane displacement amount) of an image plane based on the phase difference between the image A and the image B obtained from the output of the imaging element 106 and outputs the calculated defocus amount to the camera control unit 116. The camera control unit 116 that controls the operation of the entire imaging apparatus controls the TVAF gate 113 so as to set a TVAF frame at a predetermined percentage of an image. The camera control unit 116 performs AF control based on the TVAF evaluation value signal acquired from the TVAF signal processing unit 114 and the image plane displacement amount acquired from the phase difference AF signal processing unit 119 to thereby transmit a focus lens drive command to a lens control unit 115. Here, it is assumed that the focus lens drive amount to be set by the camera control unit 116 is an image plane shift amount (the shift amount of the image forming position of an object image). The reason for this is that a different lens unit is used for the interchangeable lens system and that the actual focus lens drive amount relative to the image plane shift amount is different depending on type of the lens unit and the lens position (the focus position or the zoom position) even if the same lens unit is used. The sign of the image plane shift amount to be set is different depending on the drive direction. For example, the image plane shift amount on the close side is plus and that on the infinity side is minus.

Figure 2B:
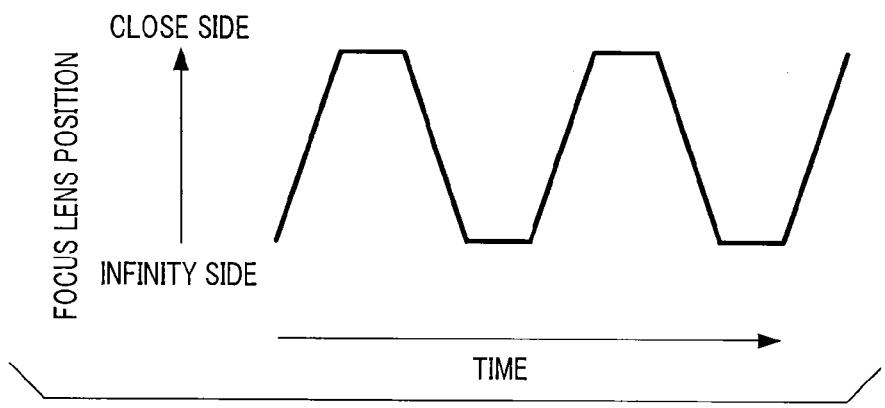
FIG. 2B is a diagram illustrating a wobbling operation.
Figure 2C:
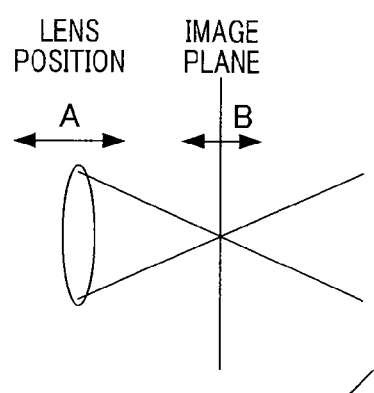
FIG. 2C is a schematic diagram illustrating a focus lens drive amount and an image plane shift amount.

FIG. 2C is a schematic diagram illustrating a lens drive amount and an image plane shift amount. The change in lens position is represented by an arrow A and the change in image plane position is represented by an arrow B. The ratio between the lens drive amount and the image plane shift amount is sensitivity that is different for each lens unit to be used and changes depending on the positions of the focus lens and the zoom lens. Sensitivity (hereinafter abbreviated as "S") is determined with reference to the data table prepared in advance in a storage unit within the lens unit 117.

Next, a description will be given of a drive unit and its control unit within the lens unit 117. A zoom drive unit 111 drives the second lens group 102, and a focus drive unit 112 drives the focus lens 105. Each of the zoom drive unit 111 and the focus drive unit 112 is constituted by an actuator such as a stepping motor, a DC motor, a vibrating motor, a voice coil motor, or the like. The lens control unit 115 receives a focus lens drive command from the camera control unit 116, controls the focus drive unit 112 in accordance with the command, and shifts the focus lens 105 in the optical axis direction to thereby perform focusing. At this time, the lens control unit 115 acquires an image plane shift amount as a lens drive amount from the camera control unit 116. The lens control unit 115 computes the actual focus lens drive amount (lens position coordinate value) from the instructed image plane shift amount to thereby perform focus control. Also, the lens control unit 115 transmits position information about the focus lens 105 to the camera control unit 116.

Next, a description will be given of a focus lens drive command to be transmitted from the camera control unit 116 to the lens control unit 115. In the present embodiment, communication is performed two times during 1V (1V is the length of one period of a vertical synchronization signal VD and the length of n periods is hereinafter represented by "nV"). In a first communication, the lens control unit 115 transmits information on the lens position and the reference position to the camera control unit 116. In a second communication, the camera control unit 116 transmits a focus lens drive command to the lens control unit 115. Each of the first communication and the second communication is fixed length packet communication. Note that the camera control unit 116 performs AF control using information received by the first communication and transmits the focus lens drive command generated by the AF control to the lens control unit 115 in the subsequent second communication.

Figures 10A, 10B, 10C:
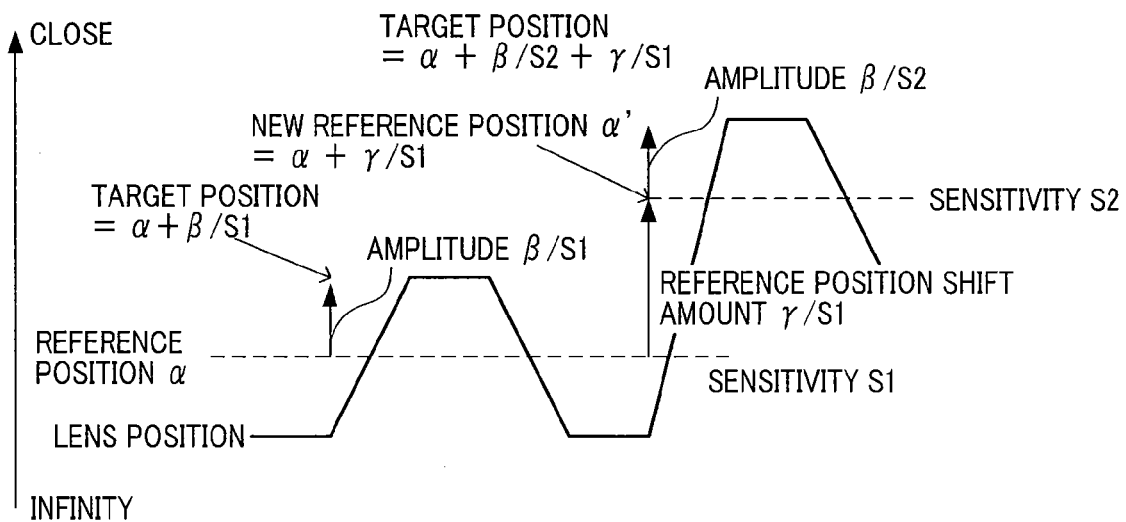
FIGS. 10A and 10B are diagrams illustrating an example of communication data.
FIG. 10C is a diagram illustrating a variant example of a focus lens during a wobbling operation.

FIGS. 10A to 10C show a drive command and the movement of the lens in accordance therewith. FIG. 10A illustrates information about drive of the focus lens 105, which is included in communication from the camera control unit 116 to the lens control unit 115. The information about drive of the focus lens is included in a drive command in the second communication and includes first information about a lens position served as a reference for a focus lens drive and second information about the shift amount of an image plane.

Reference position $\alpha$: (lens position coordinate)
Amplitude $\beta$: (image plane shift amount coordinate)
Reference position shift amount $\gamma$: (image plane shift amount coordinate)

Here, the focus lens drive amount set by the camera control unit 116 is an image plane shift amount. In other words, the amplitude $\beta$ and the reference position shift amount $\gamma$ are information about the shift amount of the image forming position of an object image. The reference position $\alpha$ is a position in a lens position coordinate system set in the focus lens 105. The reference position $\alpha$ is a position served as a reference for a drive command to be transmitted from the camera control unit 116 and is normally the vibration center position of wobbling (micro vibration).

The lens control unit 115 acquires the above information about drive of the focus lens and calculates a target position and a new reference position with the aid of the following arithmetic expression using the sensitivities S1 and S2 obtained with reference to table data. Here, the symbol S1 represents sensitivity at a current reference position and the symbol S2 represents sensitivity at a new reference position.

When there is a shift from the reference position ($\gamma \neq 0$),
Focus lens drive target position=$\alpha+\beta/S2+\gamma/S1$ (Formula 1)
New Reference position=$\alpha+\gamma/S1$ (Formula 2)
When there is no shift from the reference position ($\gamma=0$),
Focus lens drive target position=$\alpha+\beta/S1+\gamma/S1$ (Formula 1)
New Reference position=$\alpha+\gamma/S1$ (Formula 2)

Each of the amplitude $\beta$ and the reference position shift amount $\gamma$ is converted to a lens position by dividing them by sensitivity described in FIG. 2C. In other words, the lens control unit 115 computes the actual drive amount for actually driving the focus lens 105 with respect to the instructed image plane shift amount to thereby control the position of the focus lens 105. Then, the lens control unit 115 transmits information about position of the focus lens 105 to the camera control unit 116.

FIG. 10B illustrates information about the position of the focus lens 105, which is included in information to be transmitted from the lens control unit 115 back to the camera control unit 116. Communication of the information is performed in the first communication.

Focus lens position: (lens position coordinate)
New reference position: (lens position coordinate)

These positions are position information in a lens position coordinate system. As described above, information about the position of the focus lens 105 includes a plurality of position information, i.e., third information about the position of the focus lens 105 served as a new reference for micro vibration and fourth information about a focus lens position corresponding to a communication timing from the lens control unit 115 to the camera control unit 116. Note that fourth information may also be information about a focus lens position at a predetermined timing. For example, information about a predetermined timing (notification timing) may be transmitted from the camera control unit 116 in the second communication, and information about a focus lens position at the predetermined timing may be transmitted from the lens control unit 115 in the subsequent first communication. Here, when the predetermined timing received by the second communication is timing after the subsequent first communication, the lens control unit 115 may predict a focus lens position at the predetermined timing to thereby transmit the predicted focus lens position in the first communication.

Figure 11A:
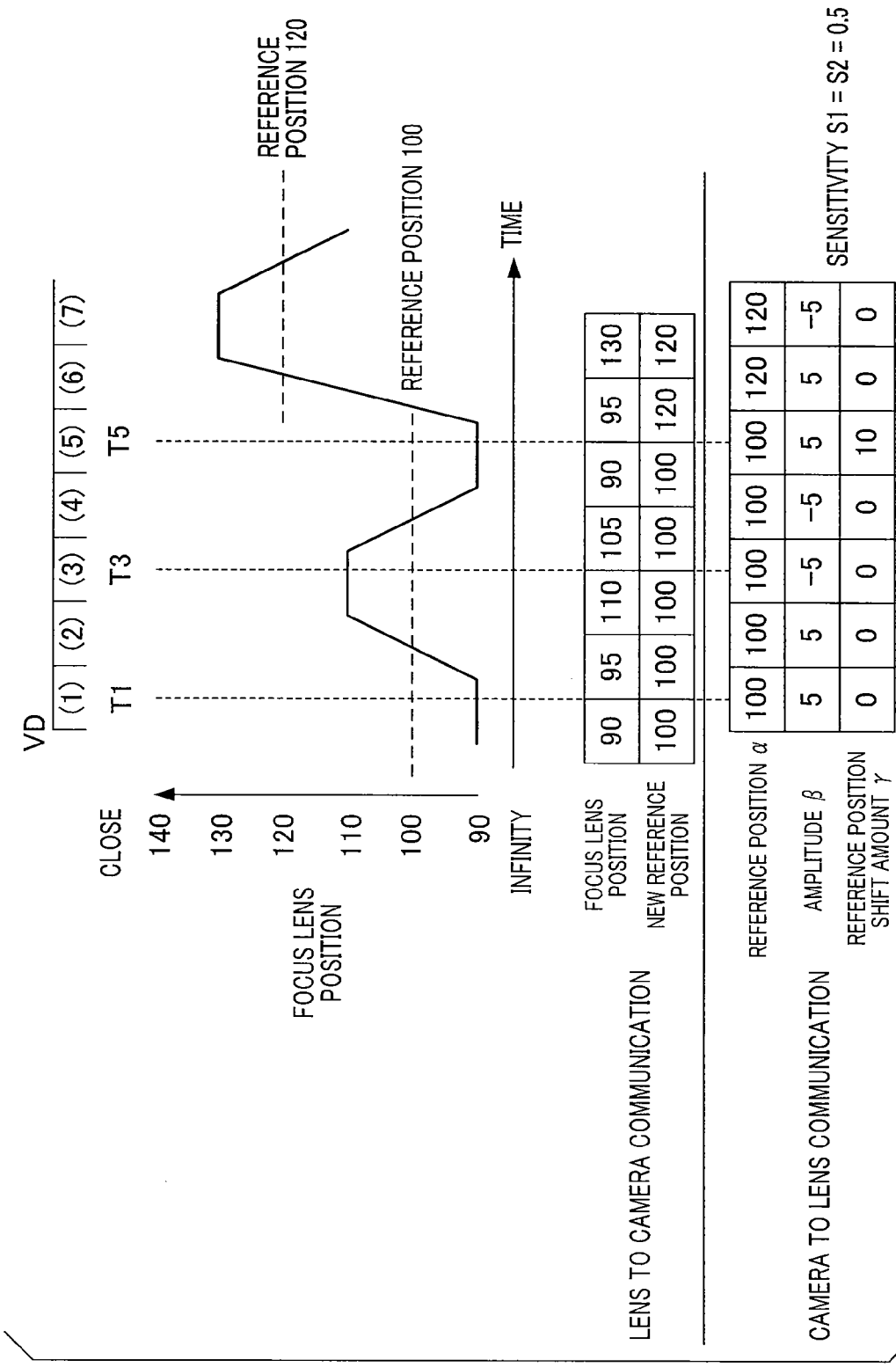
FIG. 11A is a diagram illustrating an example of control of a focus lens position.
Figure 11B:
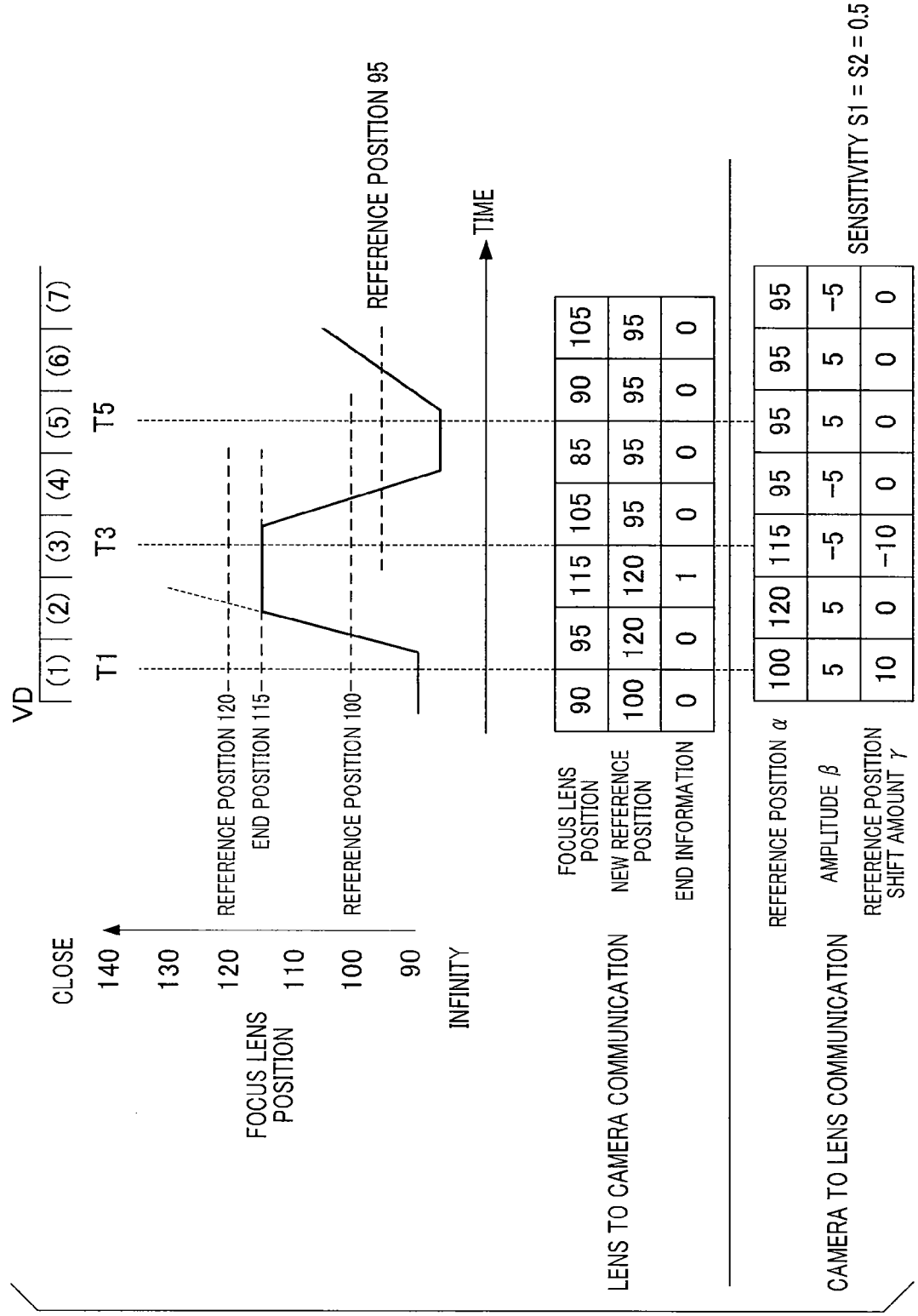
FIG. 11B is a diagram illustrating processing performed when a focus lens reaches an end of a movable region during wobbling operation.

FIG. 10C illustrates the movement of the focus lens 105 during the wobbling operation. In the example, the initial reference position is represented by $\alpha$ and a new reference position is represented by $\alpha'$. FIG. 11A is a diagram illustrating a drive command during the wobbling operation using specific numerical values, where time is plotted on the horizontal axis and timing at which a vertical synchronization signal (VD) is output is shown in the upper part of FIG. 11A. Note that the output timing of the vertical synchronization signal is synchronized with the electric charge accumulation timing of the imaging element 106. As shown in FIGS. 11A and 11B, communication from lens to camera is included in the first communication and communication from camera to lens is included in the second communication. Note that information communicated in the first communication and the second communication is not limited to those shown in FIGS. 11A and 11B. FIGS. 11A and 11B show how the focus lens 105 is driven. The following values are shown in the lower part of FIGS. 11A and 11B, respectively.

Lens→camera communication data: focus lens position, and new reference position

Camera→lens communication data: reference position $\alpha$, amplitude $\beta$, and reference position shift amount $\gamma$ The term "lens→camera" means transmission from the lens control unit 115 to the camera control unit 116, whereas the term "camera→lens" means transmission from the camera control unit 116 to the lens control unit 115.

The content of communication performed during the vertical synchronization periods (1), (3), and (5) is as follows. For ease of explanation, it is assumed that S1=S2=0.5.

Vertical synchronization period (1): time T1
"camera→lens" $\alpha=100$, $\beta=5$, $\gamma=0$
The lens control unit 115 calculates a target position and a new reference position based on the received drive command.
Focus lens drive target position=100+5/0.5+0/0.5=110
New Reference position=100+0/0.5=100
Vertical synchronization period (3): time T3
"camera→lens" $\alpha=100$, $\beta=-5$, $\gamma=0$
The lens control unit 115 calculates a target position and a new reference position based on the received drive command.

Focus lens drive target position=100−5/0.5+0/0.5=90
New Reference position=100+0/0.5=100
Vertical synchronization period (5): time T5 "camera→lens" α=100, β=5, γ=10
The lens control unit 115 calculates a target position and a new reference position based on the received drive command.
Focus lens drive target position=100+5/0.5+10/0.5=130
New Reference position=100+10/0.5=120

In the example shown in FIG. 11A, by communicating the information, the wobbling operation centered on a reference position "120" is carried out after the wobbling operation centered on a reference position "100". In the above example, after the focus lens drive is performed by the transmitted drive command, the camera control unit 116 performs AF control based on the AF evaluation value acquired from electric charges accumulated in the imaging element 106 while the focus lens is stopped at the close side/infinity side. For example, after the focus lens is driven in the close direction by the drive command transmitted at the time T1 by the camera control unit 116, the camera control unit 116 generates a drive command to be transmitted at the time T3 based on the AF evaluation value acquired from electric charges accumulated while the focus lens is stopped at the close side.

Although no description has been given above, a focus lens position and a new reference position are also transmitted from the lens control unit 115 to the camera control unit 116 in the vertical synchronization periods (2), (4), and (6). Also, the reference position α, the amplitude β, and the reference position shift amount γ are transmitted from the camera control unit 116 to the lens control unit 115. Since the AF evaluation values acquired in the vertical synchronization periods (2), (4), and (6) are values generated from electric charges accumulated in the imaging element 106 while the focus lens is driven, the AF evaluation values are not used for AF control. Thus, the reference position α and the amplitude β are the same as those used previously and the reference position shift amount γ is transmitted as zero. However, the above condition is no longer applicable if the focus lens reaches an end of a movable region.

Next, FIG. 11B shows a state in which the focus lens reaches an end of a set movable region during the wobbling operation. When the focus lens reaches an end of a movable region, the lens control unit 115 transmits a command (including end information) indicating that the focus lens position is at an end of a movable region to the camera control unit 116. End information is included in data transmitted from the lens control unit 115 to the camera control unit 116 in the first communication for each 1V. In FIG. 11B, the camera is informed of whether or not the focus lens position is at an end of a movable region by setting a bit corresponding to end information to 0 or 1. In the present embodiment, when the focus lens position does not reach an end of a movable region, the bit is set to "0", whereas the focus lens position reaches an end of a movable region, the bit is set to "1".

Lens→camera communication data: focus lens position, new reference position, and end information
Camera→lens communication data: reference position α, amplitude β, and reference position shift amount γ
The term "lens→camera" means transmission from the lens control unit 115 to the camera control unit 116, whereas the term "camera→lens" means transmission from the camera control unit 116 to the lens control unit 115.
The content of communication performed during the vertical synchronization periods (1), (3), and (5) is as follows. For ease of explanation, it is assumed that S1=S2=0.5 and the focus end position is "115".

Vertical synchronization period (1): time T1 "camera→lens" α=100, β=5, γ=10
The lens control unit 115 calculates a target position and a new reference position based on the received drive command.
Focus lens drive target position=100+5/0.5+10/0.5=130
New Reference position=100+10/0.5=120
Although the drive target position of the focus lens is "130", the lens control unit 115 stops the focus lens at position "115" because the focus end position is "115". Furthermore, the focus lens position "115" (the position of the focus end), a new reference position "120", and end information "1" are transmitted in a communication cycle after 2V (corresponds to the vertical synchronization period (3)).

Next, the camera control unit 116 sets the reference position α to the focus end position. At this time, the camera control unit 116 sets a double value of the amplitude β to the reference position shift amount γ.

Vertical synchronization period (3): time T3 "camera→lens" α=115, β=−5, γ=−10
The lens control unit 115 calculates a target position and a new reference position based on the received drive command.
Focus lens drive target position=115−5/0.5−10/0.5=85
New Reference position=115−10/0.5=95
The lens control unit 115 transmits the calculated target position and new reference position to the camera control unit 116 in a communication cycle after 2V (corresponds to the vertical synchronization period (5)).

Vertical synchronization period (5): time T5 "camera→lens" α=95, β=5, γ=0
The lens control unit 115 calculates a target position and a new reference position based on the received drive command.
Focus lens drive target position=95+5/0.5+0/0.5=105
New Reference position=95+0/0.5=95
The lens control unit 115 transmits the calculated target position and new reference position to the camera control unit 116 in a communication cycle after 2V (corresponds to the vertical synchronization period (7)). In the example, after the focus lens reaches an end of a movable region during the wobbling operation centered on the reference position "100", the wobbling operation centered on a reference position "95" is performed.

Next, a description will be given of AF control performed by the camera control unit 116 with reference to the flowcharts shown in FIG. 4 and FIG. 5. The control is executed in accordance with a computer program stored in a memory provided in the camera control unit 116.

In step S601, the process starts. In step S602, wobbling operation for driving the focus lens 105 at micro intervals is performed. In the operation, focus determination of whether or not the focus lens 105 is in a focused state and direction determination as to a direction of a focal point exists if the focus lens 105 is in a non-focused state can be made. The detailed description will be given below of the operation with reference to FIG. 6 and FIG. 7. In step S603, whether or not focus determination was successfully made is determined. If focus determination was successfully made, the process advances to step S612, and focus stop and reactivation determination processing is performed. If focus determination was not successfully made, the process advances to step S604. In step S604, whether or not direction determination was successfully made is determined. If direction determination was successfully made, the process advances to step S605 shown in FIG. 5 and mountain-climbing driving is performed. If direction determination was not successfully made, the process advances to step S608.

In step S605, the mountain-climbing driving for the focus lens 105 is executed at a predetermined speed along the determined direction. The mountain-climbing driving controls the focus lens 105 to drive in a direction of increasing a TVAF evaluation value. The processing for searching the position of the focus lens 105 where the TVAF evaluation value becomes its peak value (hereinafter referred to as "peak position") by associating the TVAF evaluation value with the focus lens position acquired from the lens unit 117 is performed. The detailed description will be given below of the search processing with reference to FIG. 12 and FIG. 13. In step S606, the camera control unit 116 sets the following drive information in order to return the focus lens 105 to the peak position during the mountain-climbing driving operation.

Reference position=peak position
Amplitude=0
Reference position shift amount=0

The drive information is transmitted to the lens control unit 115. As a result, the focus lens 105 can be shifted to the peak position.

In step S607, determination processing whether or not the focus lens 105 has returned to the peak position is performed. If the focus lens 105 has returned to the peak position, the process returns to step S602 shown in FIG. 4 and the wobbling operation is performed again. If the focus lens 105 has not returned to the peak position, the process returns to step S606 and the mountain-climbing driving operation is continued.

Figure 4:
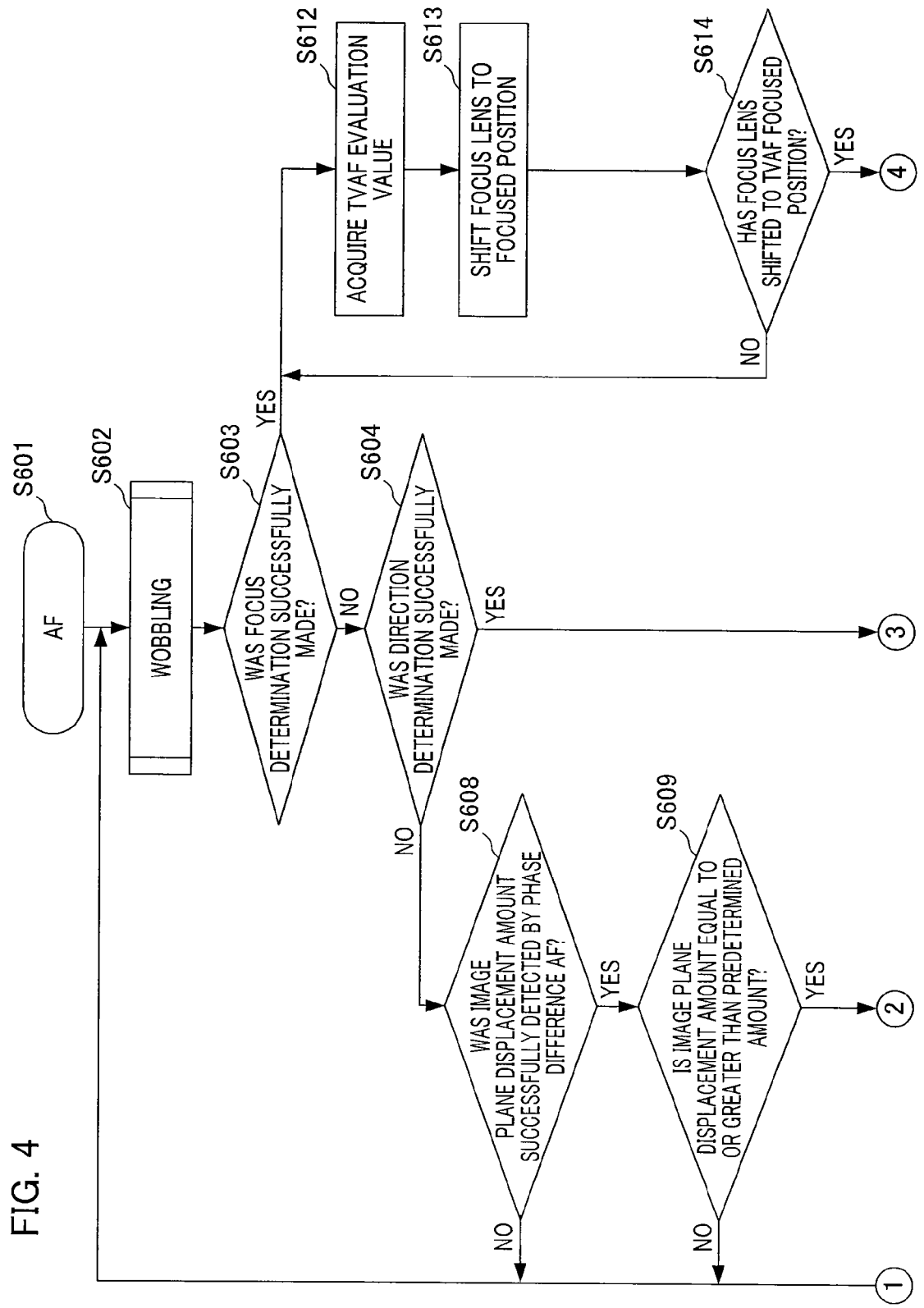
FIG. 4 is a flowchart (former half) illustrating TVAF processing in conjunction with FIG. 5.
Figure 5:
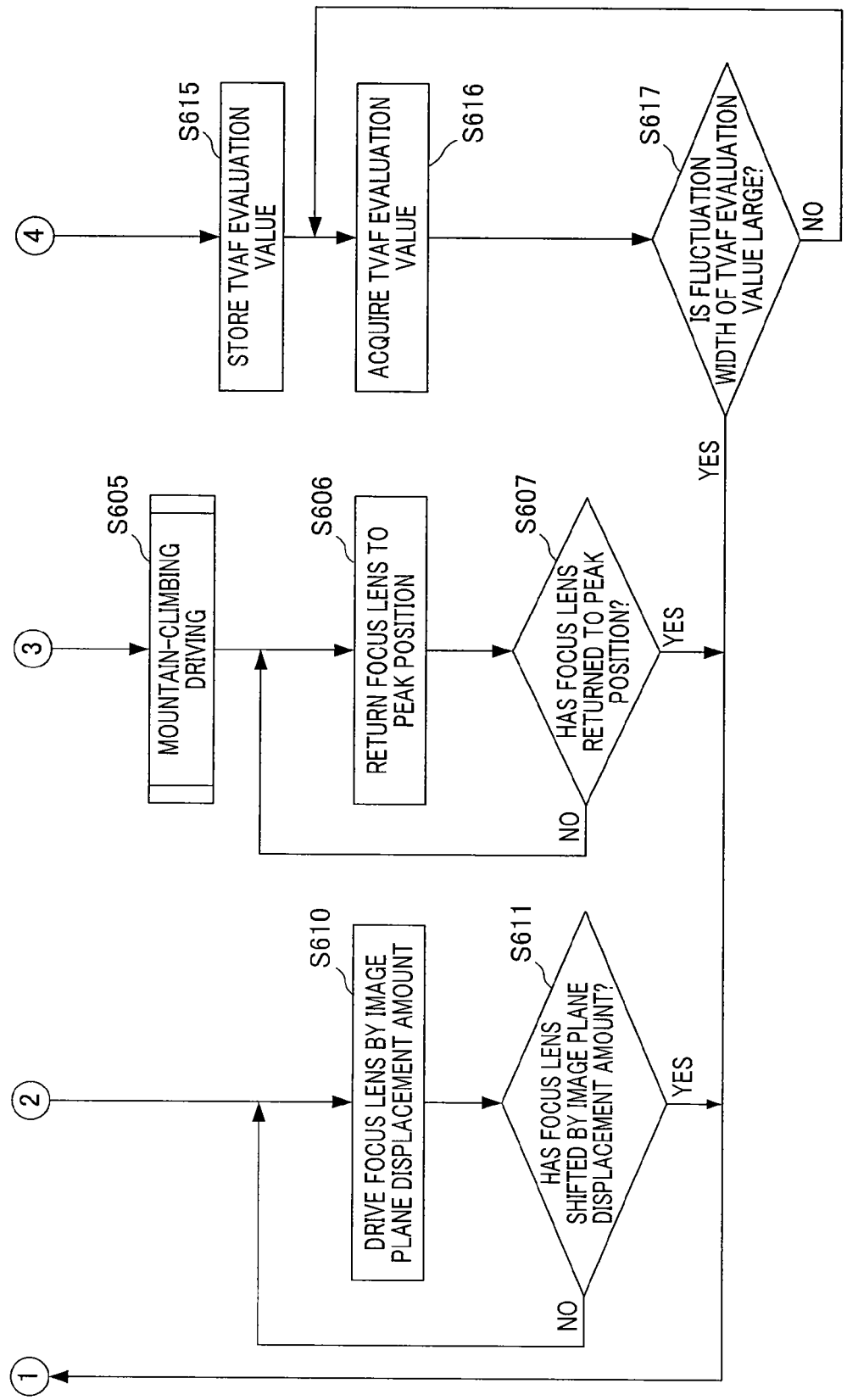
FIG. 5 is a flowchart (latter half) illustrating the continuation of FIG. 4.

If direction determination was not successfully made in step S604 shown in FIG. 4, the process advances to step S608 and processing for determining whether or not the image plane displacement amount was successfully detected by phase difference detection is performed. If the image plane displacement amount was successfully detected in step S608, the process advances to step S609 and it is determined whether or not the image plane displacement amount is equal to or greater than a predetermined amount (threshold value). If the image plane displacement amount is equal to or greater than a predetermined amount, the process advances to step S610 shown in FIG. 5 and the focus lens 105 is driven by an amount corresponding to the image plane displacement amount. The drive information to be set in this case is as follows:

Reference position=focus lens position at a time point corresponding to the center of the period for accumulation in electric charges for focus detection pixels during phase difference detection Amplitude=value corresponding to the image plane displacement amount detected by phase difference AF Reference position shift amount=0

The drive information is transmitted to the lens control unit 115. In the case of phase difference detection, electric charges may be accumulated across a few frames to thereby generate an image signal. Thus, the camera control unit 116 calculates a focus lens position at a time point corresponding to the center of the period for accumulation in electric charges upon detection of the image plane displacement amount based on the focus lens position received by the lens control unit 115 in the first communication during electric charge accumulation for phase difference detection. The calculated position is transmitted as information about the reference position to the lens control unit 115. In the next step S611, it is determined whether or not the focus lens 105 has shifted from the current focus lens position by an amount corresponding to the image plane displacement amount detected by phase difference AF. If lens driving was performed by an amount corresponding to the image plane displacement amount, the process returns to step S602 shown in FIG. 4, whereas if lens driving was not performed, the process returns to step S610. On the other hand, if the image plane displacement amount was not successfully detected in step S608 or if the image plane displacement amount is less than a predetermined amount in step S609, the process returns to step S602.

Next, a description will be given of focus stop and reactivation determination processing from step S612 shown in FIG. 4. In step S612, the camera control unit 116 acquires a TVAF evaluation value. In step S613, the following drive information is set so as to shift the focus lens 105 to the position determined to be in-focus, i.e., the peak position.

Reference position=peak position
Amplitude=0
Reference position shift amount=0

The drive information is transmitted to the lens control unit 115. As a result, the focus lens 105 can be driven to the position determined to be in-focus.

In step S614, processing for determining whether or not the focus lens 105 has shifted to the peak position is performed. If the focus lens 105 has shifted to the peak position, the process advances to step S615 shown in FIG. 5, whereas if otherwise, the process returns to step S612. In step S615, the camera control unit 116 stores a TVAF evaluation value at a focal point in a memory. In step S616, the camera control unit 116 acquires a TVAF evaluation value at present time from the TVAF signal processing unit 114. In step S617, processing for determining whether or not the fluctuation width of the TVAF evaluation value is large is performed by comparing the TVAF evaluation value stored in step S615 with the latest TVAF evaluation value acquired in step S616. It is determined whether the fluctuation width is small or large by comparing the fluctuation width with a threshold value. When the TVAF evaluation value fluctuates largely, the camera control unit 116 determines that an object has been changed and the process returns to step S602 shown in FIG. 4 and then the camera control unit 116 resumes the wobbling operation. If the fluctuation width of the TVAF evaluation value is equal to or less than a threshold value, the process returns to step S616.

Next, a description will be given of the micro-driving operation with reference to FIG. 6 and FIG. 7. In step S701, the process starts. In step S702, a wait (wait processing) is executed at the timing of the vertical synchronization signal (VD) such that the following processing is performed at a predetermined cycle.

In step S703, the camera control unit 116 communicates with the lens control unit 115 to thereby acquire information about the current position, the reference position, and the like of the focus lens 105. In step S704, processing for determining a drive cycle and a drive delay time is performed. In the example, the drive cycle is 2V and the drive delay time is ½V. In step S705, the camera control unit 116 determines whether or not the value of the current variable Mode is zero. The Mode is an internal variable representing a difference in state from zero to three. If the value is zero, the process advances to step S706, whereas if the value is other than zero, the process advances to step S711.

In step S706, the camera control unit 116 stores the TVAF evaluation value as the infinity-side TVAF evaluation value in a memory. This is an evaluation value based on the output of the imaging element 106 accumulated while the focus lens 105 remains stayed at the infinity side. In the next step S707 (see FIG. 7), a value for Mode increments by one, and the process advances to step S708. If a value for Mode is equal to or greater than four, the value returns to zero.

In step S708, it is determined whether or not directions determined as the focusing direction are the same successively for a preset number of times (hereinafter referred to as "NA"). If it is determined that directions determined as the focusing direction are the same successively for a number of NA times, the process advances to step S725, whereas if otherwise, the process advances to step S709. In step S709, it is determined whether or not the focus lens 105 has been reciprocated repeatedly within the same area for a preset number of times (hereinafter referred to as "NB"). If the focus lens 105 has been reciprocated repeatedly within the same area for a number of NB times, the process advances to step S726, whereas if otherwise, the process advances to step S710 and the camera control unit 116 transmits the drive command for the focus lens 105 to the lens control unit 115.

In step S725, the camera control unit 116 determines that direction determination was successfully made, and the process advances to step S728. The series of processes are ended and the process shifts to mountain-climbing driving. In step S726, a focus position is computed based on past lens position information. In step S727, the camera control unit 116 determines that focus determination was successfully made, and the process advances to step S728. The series of processes are ended and the process shifts to focus stop and reactivation determination.

Figure 6:
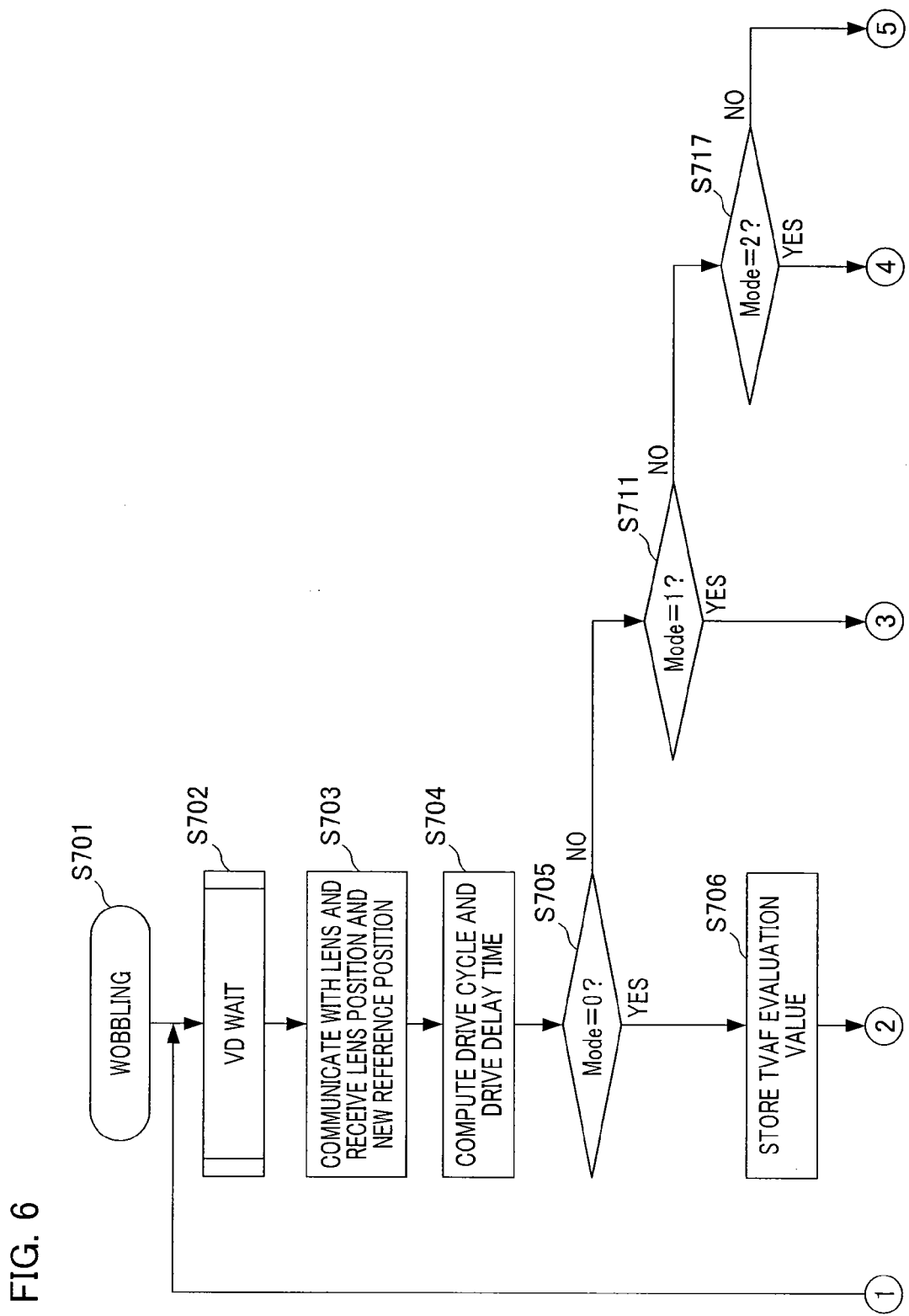
FIG. 6 is a flowchart (former half) illustrating wobbling operation in conjunction with FIG. 7.
Figure 7:
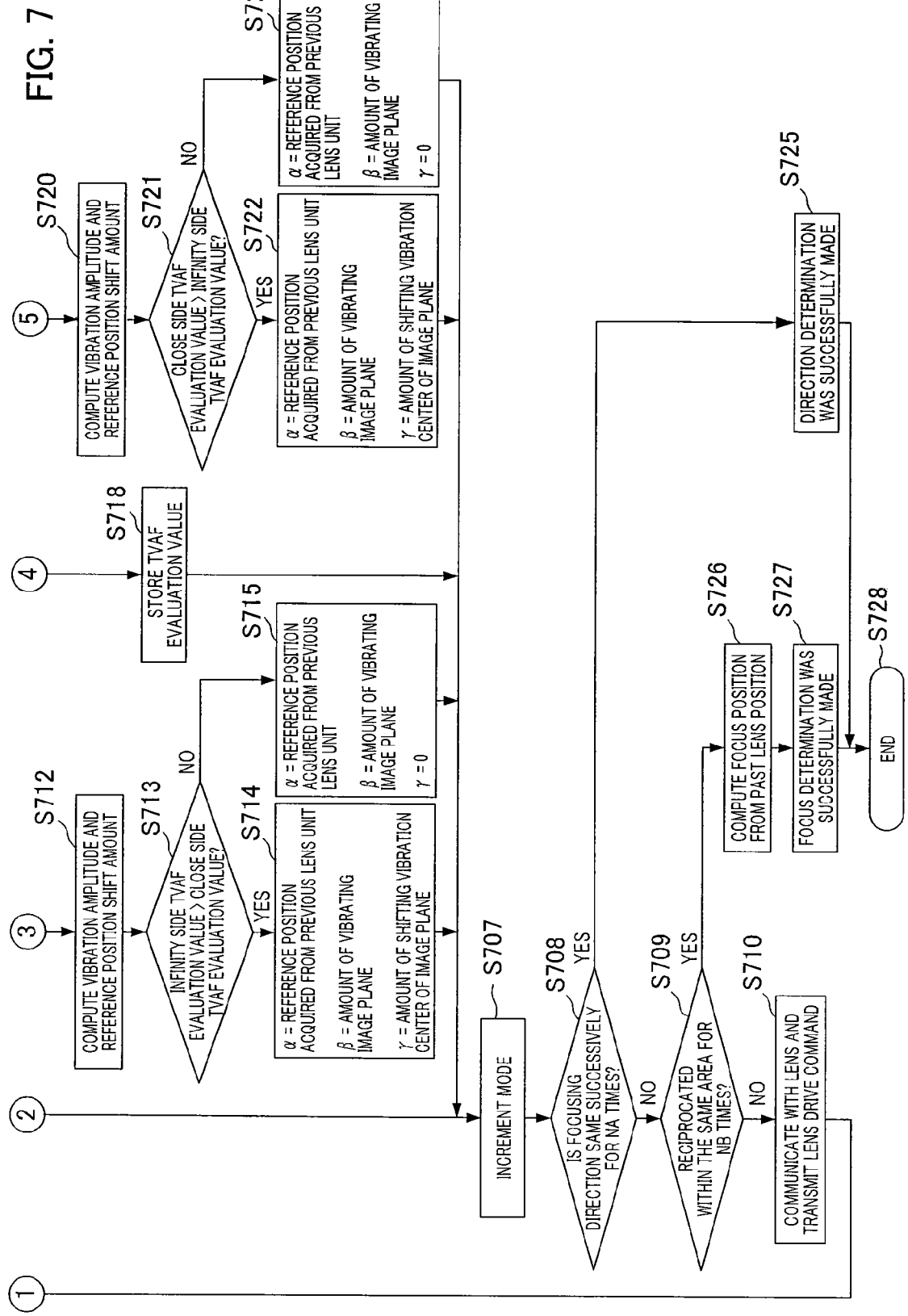
FIG. 7 is a flowchart (latter half) illustrating the continuation of FIG. 6.

In step S711 shown in FIG. 6, it is determined whether or not a value for Mode at present time is one. If the value for Mode is one, the process advances to step S712 shown in FIG. 7, whereas if the value for Mode is other than one, the process advances to step S717. In step S712, an amplitude value indicating how much an image plane should be vibrated from the reference position and a reference position shift amount indicating how much the vibration center should be shifted on an image plane are computed. Here, the drive amount is an image plane shift amount. For amplitude, although no detailed description will be given, processing for setting a small amplitude value when the depth of focus is shallow and for setting a large amplitude value when the depth of focus is deep is performed on the basis of the depth of focus. In step S713, the infinity-side TVAF evaluation value (see step S706) obtained when the value for Mode is zero is compared with the close-side TVAF evaluation value (see step S718) obtained when the value for Mode is two (to be described below). If the infinity-side TVAF evaluation value is greater than the close-side TVAF evaluation value, the process advances to step S714. If the infinity-side TVAF evaluation value is not greater than the close-side TVAF evaluation value, the process advances to step S715.

In step S714, the camera control unit 116 sets the following drive information.
Reference position=reference position acquired from previous lens position information
Amplitude=the amount of vibrating an image plane
Reference position shift amount=the amount of shifting the vibration center of an image plane
The drive information is transmitted to the lens control unit 115. As a result, the reference position of the focus lens 105 is shifted by an amount corresponding to the reference position shift amount so that the focus lens 105 can be shifted from a new reference position by the drive amount corresponding to amplitude.

In step S715, the camera control unit 116 sets the following drive information.
Reference position=reference position acquired from previous lens position information
Amplitude=the amount of vibrating an image plane
Reference position shift amount=0
The drive information is transmitted to the lens control unit 115. As a result, the focus lens 105 can be shifted from the reference position by the drive amount corresponding to amplitude. After step S714 or step S715, the process advances to step S707.

In step S717 shown in FIG. 6, it is determined whether or not the value for Mode at present time is two. If the value for Mode is two, the process advances to step S718 shown in FIG. 7, whereas if the value for Mode is other than two, the process advances to step S720 shown in FIG. 7.

In step S718, the camera control unit 116 stores the TVAF evaluation value as the close-side TVAF evaluation value in a memory. The TVAF evaluation value is based on the sensor output accumulated while the focus lens 105 remains stayed at the close side. Then, the process advances to step S707. Step S708 and subsequent steps are the same as described above.

In step S720, processing for driving the focus lens 105 to the close side is performed and the camera control unit 116 computes the amplitude and the reference position shift amount. These are the image plane shift amount. In the next step S721, the infinity-side TVAF evaluation value (see step S706) obtained when the value for Mode is zero is compared with the close-side TVAF evaluation value (see step S718) obtained when the value for Mode is two. If the close-side TVAF evaluation value is greater than the infinity-side TVAF evaluation value, the process advances to step S722. If the close-side TVAF evaluation value is not greater than the infinity-side TVAF evaluation value, the process advances to step S723.

In step S722, the camera control unit 116 sets the following drive information.
Reference position=reference position acquired from previous lens position information
Amplitude=the amount of vibrating an image plane
Reference position shift amount=the amount of shifting the vibration center on an image plane
The drive information is transmitted to the lens control unit 115. In step S723, the camera control unit 116 sets the following drive information.
Reference position=reference position acquired from previous lens position information
Amplitude=the amount of vibrating an image plane
Reference position shift amount=0
The drive information is transmitted to the lens control unit 115. After step S722 or step S723, the process advances to step S707.

FIG. 8A shows an example of the time profile of the focus lens operation, where time is plotted on the horizontal axis and vertical synchronization signal VD of the image signal is plotted on the uppermost part of FIG. 8A. The parallelogram frame shown beneath the vertical synchronization signal VD represents the accumulation time of an imaging element (CMOS sensor) (see first to eleventh accumulation periods), and EVx (x=1 to 10) shown beneath the parallelogram frame represents an TVAF evaluation value obtained at the timing. Furthermore, the change in position of the focus lens 105 is shown beneath the TVAF evaluation value. Tx (x=3, 5, 6) represents a time at which the TVAF evaluation value is taken into the camera control unit 116.

FIG. 8B is a diagram illustrating the driving of a CMOS sensor. FIG. 8B shows an image capturing plane and scanning lines on the left side thereof and an accumulation time and a transfer time for each scanning line on the right side thereof. The CMOS sensor employs a rolling shutter system for performing a shutter operation for each scanning line. Thus, an accumulation time and a transfer time are different in the upper part and the lower part of the screen as shown in FIG. 8B. In other words, the delay occurs in an accumulation period and a transfer period attached to the tail thereof for each scanning line. The parallelogram frame shown in FIG. 8A represents the entire accumulation period.

During the wobbling operation (see FIG. 2B), the TVAF evaluation value is monitored while moving the focus lens 105 between the close side and the infinity side to thereby drive the focus lens 105 in the focusing direction. At this time, while the focus lens 105 is located on the close side or the infinity side, the TVAF evaluation value needs to be acquired from the image signal accumulated in the imaging element 106. For this purpose, the driving timing of the focus lens 105 needs to be matched with the accumulation period of the imaging element 106. Although the focus lens 105 is not located on the close side or the infinity side across the entire accumulation period, the TVAF frame (focus state detecting frame) is set to a small range with respect to the image capturing screen, which is sufficient for accumulation of scanning lines within the TVAF frame. For example, for electric charges accumulated in the imaging element 106 during the third accumulation period shown in FIG. 8A, a TVAF evaluation value EV3 is acquired by the camera control unit 116 at a time T3. For electric charges accumulated in the imaging element 106 during the fifth accumulation period, a TVAF evaluation value EV5 is acquired by the camera control unit 116 at a time T5. At a time T6, the TVAF evaluation values EV3 and EV5 are compared to each other. If EV5>EV3, the vibration center shifts, whereas if EV3≥EV5, the vibration center does not shift. In this manner, the focusing direction and the focused state are determined.

Figure 9:
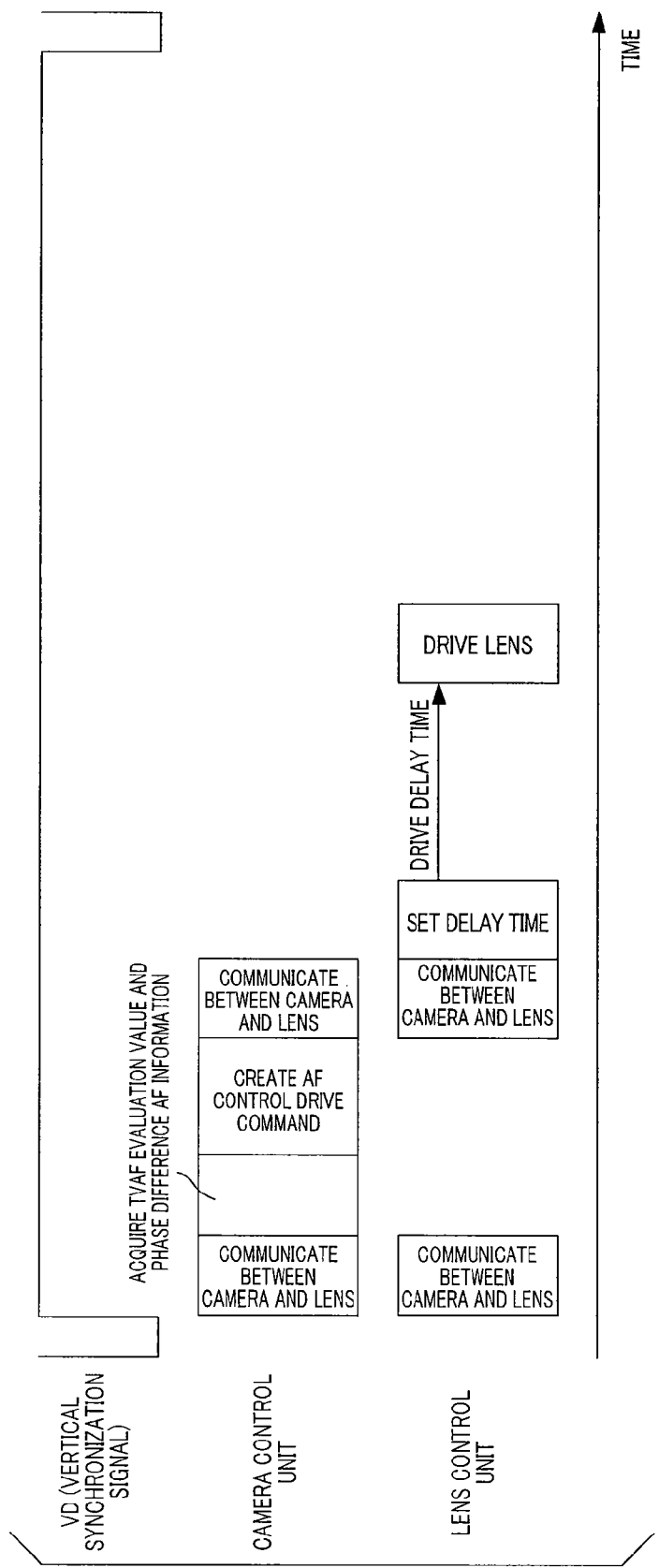
FIG. 9 is a diagram illustrating processing performed by a camera control unit and a lens control unit.

FIG. 9 is a diagram illustrating processing performed by the camera control unit 116 and the lens control unit 115 in 1V, where time is plotted on the horizontal axis. Firstly, immediately after obtaining the vertical synchronization signal (VD), the camera control unit 116 acquires information about a lens position and a reference position from the lens control unit 115. Next, the camera control unit 116 performs AF control by acquiring a TVAF evaluation value and phase difference AF information to thereby create a focus lens drive command. After receiving the focus lens drive command from the camera control unit 116, the lens control unit 115 computes a focus drive target position as described above. After the wait processing for a drive delay time, lens driving processing is performed to thereby actually shift the focus lens 105.

Figure 12:
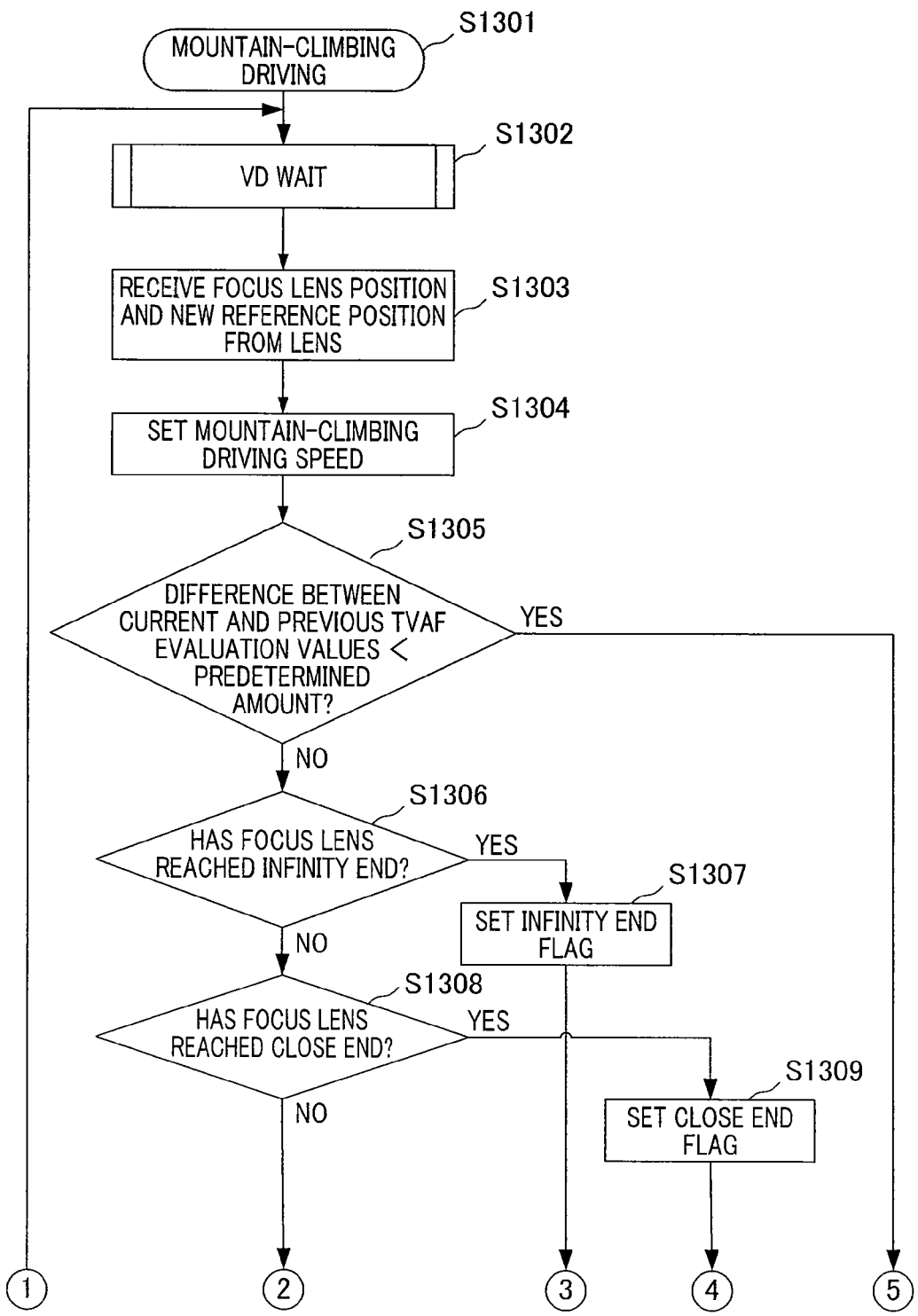
FIG. 12 is a flowchart (former half) illustrating mountain-climbing driving in conjunction with FIG. 13.

Next, a description will be given of the mountain-climbing driving operation with reference to FIG. 12 and FIG. 13. In step S1301, the process starts. In step S1302, wait processing is executed such that the following processing is performed at a predetermined cycle and the following processing starts at the timing of VD. In step S1303, the camera control unit 116 communicates with the lens control unit 115 to thereby acquire information about the focus lens position, the reference position, and the like. In step S1304, the camera control unit 116 sets a mountain-climbing driving speed. Here, the mountain-climbing driving speed is an image plane shift amount per unit time (e.g., per one second). Although no detailed description will be given, processing for setting a low speed at which the image plane changes when the depth of focus is shallow and for setting a high speed when the depth of focus is deep is performed on the basis of the depth of focus. As a result, the change amount of blur is substantially constant without providing a sense of unnatural impression.

In step S1305, the TVAF evaluation value acquired in step S1303 is compared with the previous TVAF evaluation value. It is determined in step S1305 whether or not the difference between the current and previous TVAF evaluation values is smaller than a predetermined amount (threshold value). If the difference is smaller than a predetermined amount, the process advances to step S1306, whereas if the difference is not smaller than a predetermined amount, the process advances to step S1312 shown in FIG. 12. Here, the predetermined amount is a determination reference value which is determined in consideration of the S/N (signal-to-noise) ratio of the TVAF evaluation value and is set to be equal to or greater than the fluctuation width of the TVAF evaluation value under the condition that the focus lens position is constant by fixing the object. If such settings are not made, the focus lens position may be affected by the fluctuation of the TVAF evaluation value, whereby the mountain-climbing driving cannot be made in the correct direction.

In step S1306, processing for determining whether or not the focus lens 105 has reached the infinity end is performed. The infinity end is the end position closest to the infinity side in the movable range of the focus lens 105 by design. If the focus lens 105 has reached the infinity end, the process advances to step S1307, whereas if the focus lens 105 has not reached the infinity end, the process advances to step S1308. In step S1308, processing for determining whether or not the focus lens 105 has reached the close end is performed. The close end is the end position closest to the close side in the movable range of the focus lens 105 by design. If the focus lens 105 has reached the close end, the process advances to step S1309, whereas if the focus lens 105 has not reached the close end, the process advances to step S1310 shown in FIG. 13. In steps S1307 and S1309, a flag for storing an end in which the drive direction is reversed is set. In step S1307, an infinity end flag is set. In step S1309, a close end flag is set. Then, the process advances to step S1314 shown in FIG. 13. The focus lens 105 continues mountain-climbing driving by reversing the drive direction to the backward direction.

Figure 13:
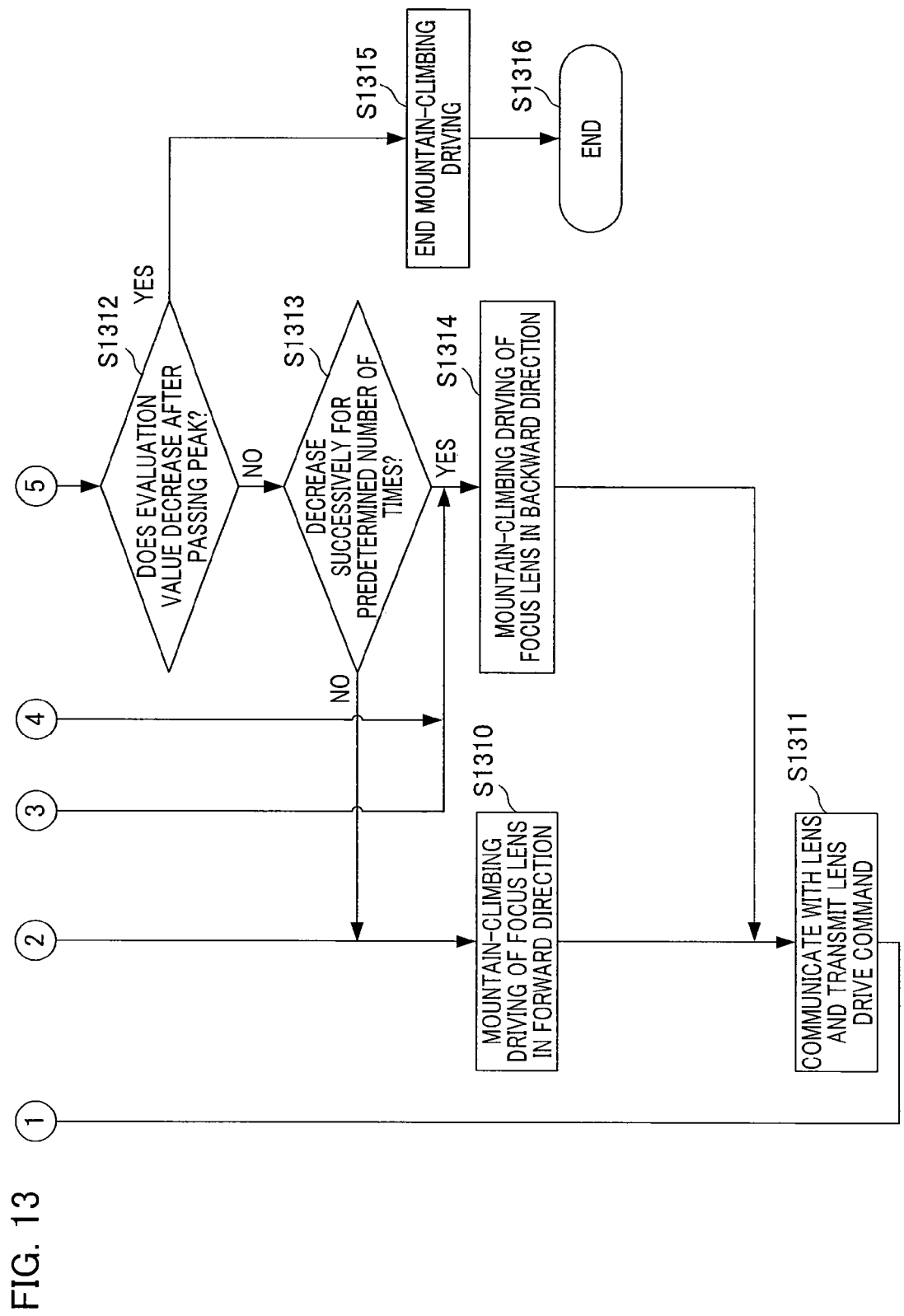
FIG. 13 is a flowchart (latter half) illustrating the continuation of FIG. 12.

In step S1310 shown in FIG. 13, the camera control unit 116 sets the following drive information in order to perform the mountain-climbing driving operation for the focus lens 105 at the speed determined in step S1304 along the same forward direction as the previous direction.

Reference position=focus lens position acquired in first communication

Amplitude=value corresponding to direction (e.g., represented by +1 or −1)

Reference position shift amount=0

After step S1310 or step S1314, the process advances to step S1311, and the set drive information is transmitted to the lens control unit 115. In addition to the above information, the lens control unit 115 also receives information about an image plane shift amount per unit time. Then, the lens control unit 115 calculates the shift amount of the focus lens 105 in 1V using the received image plane shift amount per unit time. The lens control unit 115 can shift the actual position of the focus lens 105 by an amount corresponding to the desired image plane shift amount based on information received from the camera control unit 116. Then, the process returns to step S1302, and the current processing ends.

In step S1312, processing for determining whether or not the TVAF evaluation value decreases after passing its peak position is performed. If the TVAF evaluation value does not decrease, the process advances to step S1313. If the focus lens 105 passes over the peak position and the TVAF evaluation value decreases, the process advances to step S1315 to thereby end mountain-climbing driving. Then, the process advances to step S1316. The series of processes are ended and the process shifts to the wobbling operation. In step S1313, it is determined whether or not the TVAF evaluation value decreases successively for a predetermined number of times. If it is determined that the TVAF evaluation value decreases successively for a predetermined number of times, the process advances to step S1314, whereas if otherwise, the process advances to step S1310.

In step S1314, the camera control unit 116 sets the following drive information in order to perform the mountain-climbing driving operation for the focus lens 105 at the speed determined in step S1304 in a direction opposite to the previous direction.

Reference position=focus lens position acquired in first communication

Amplitude=value corresponding to direction (e.g., represented by +1 or −1, which is the opposite sign of the previous one)

Reference position shift amount=0

The process advances to step S1311, the drive information determined in step S1314 is transmitted to the lens control unit 115.

Figure 14:
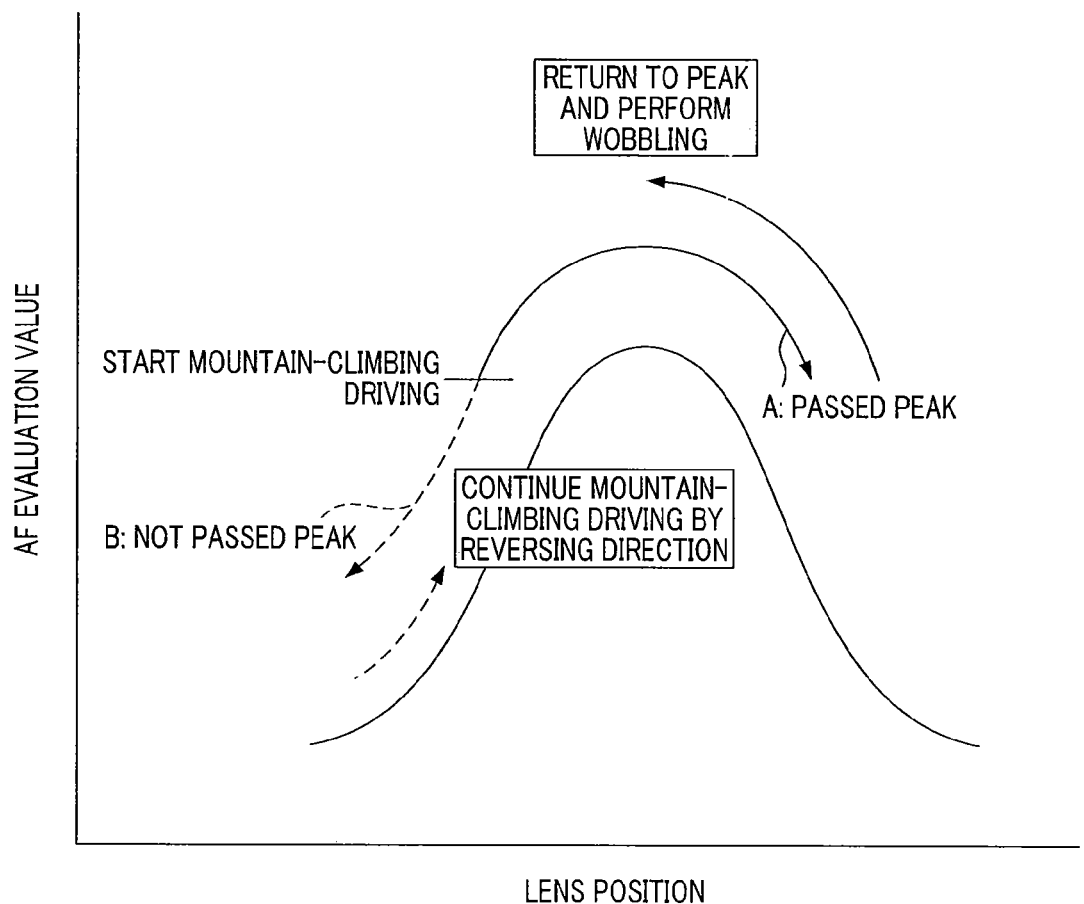
FIG. 14 is a diagram illustrating mountain-climbing driving.

FIG. 14 illustrates the movement of the focus lens 105 during the mountain-climbing driving operation. In the symbol A shown in FIG. 14, the TVAF evaluation value decreases after passing the peak value. Thus, the camera control unit 116 determines that the focus lens 105 has passed the focal point and ends the mountain-climbing driving operation. The process shifts to the wobbling operation. On the other hand, in the symbol B shown in FIG. 14, the TVAF evaluation value decreases without finding the peak value, the camera control unit 116 reverses the drive direction to thereby continue the mountain-climbing driving operation.

As described above, the focus lens 105 shifts while repeating the sequence of "reactivation determination→wobbling→mountain-climbing driving→wobbling→reactivation determination". The imaging apparatus maintains the focused state by performing focus adjustment control such that the TVAF evaluation value always becomes the maximum value.

According to the present embodiment, an integrated drive command can be provided from an imaging apparatus body to a lens apparatus in an interchangeable lens system so that the various focus lens operations including a wobbling operation are controlled. More specifically, the "reference position, amplitude, and reference position shift amount" are transmitted as drive information from an imaging apparatus body to a lens apparatus. As a result, the necessity of switching a drive command in response to an operation state such as a wobbling operation, a mountain-climbing driving operation, or the like is eliminated. Thus, the movement of the focus lens can be controlled in accordance with a drive command given by the control unit provided in an imaging apparatus body without complicating a control system. Also, an image plane shift amount is set by a drive command issued by an imaging apparatus body and thus a lens apparatus that has received the drive command can perform lens driving by calculating the actual drive amount of the focus lens corresponding to the image plane shift amount.

In the embodiments, a description has been given mainly to an example in which a drive command for a wobbling operation is transmitted from the camera control unit 116 to the lens control unit 115. The present invention is not limited thereto, but the camera control unit 116 can transmit drive information regarding the shift operation of a specific image plane shift amount and the shift operation to a specific lens position to the lens control unit 115. The drive control method of the embodiments may also be applicable to the driving of a movable optical member other than a focus lens, such as a zoom lens, an image shape correcting lens, or the like.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-004560 filed on Jan. 13, 2012, and Japanese Patent Application No. 2012-238265 filed on Oct. 29, 2012 which are hereby incorporated by reference herein in their entirety.

What is claimed is:

1. An imaging apparatus that is mountable to a lens unit provided with an imaging optical system including a focus lens, the imaging apparatus comprising:

an imaging unit configured to generate an imaging signal by photo-electrically converting an object image in synchronization with an output of a vertical synchronization signal;

a signal processing unit configured to generate an evaluation signal for focus adjustment using the imaging signal; and a control unit configured to generate drive information about a focus lens based on the evaluation signal and to transmit the drive information to the mounted lens unit, wherein, when micro vibration of the focus lens is performed, the control unit is configured to transmit to the lens unit first information about a position of the focus lens to serve as a reference position for micro vibration and second information about an amount of movement of the focus lens indicated as a shift amount of an image plane with reference to the position of the focus lens corresponding to the first information as the drive information, and to receive third information, which is generated by the lens unit based on the first information and the second information, about the position of the focus lens to serve as an actual reference position for the micro vibration, wherein the control unit is configured to communicate with the lens unit twice during a time period from a time when the vertical synchronization signal is output to a time when a next vertical synchronization signal is output, the control unit being configured to receive the third information based on the last first information and the second information from the lens unit in a first communication, and to transmit the next first information and the second information to the lens unit in a second communication.

2. The imaging apparatus according to claim 1, wherein the control unit transmits to the lens unit information, as the second information, indicating the shift amount of the image forming position of an object image with reference to the position of the focus lens corresponding to the first information.

3. The imaging apparatus according to claim 1, wherein the control unit is configured to receive the third information from the lens unit in the first communication and to set the next first information based on the received third information.

4. The imaging apparatus according to claim 1, wherein the control unit is configured to receive the third information and fourth information from the lens unit in the first communication, and to set the next first information based on the third information and the fourth information,
  wherein the fourth information is information about the position of the focus lens at time indicated in the second communication by the control unit.

5. The imaging apparatus according to claim 4, wherein, when the control unit receives, from the lens unit, the fourth information and information indicating that the position of the focus lens corresponding to the fourth information is an end of a movable region of the focus lens, the control unit is configured to transmit to the lens unit information corresponding to the fourth information as next first information.

6. The imaging apparatus according to claim 1, wherein, when mountain-climbing driving is performed to drive the focus lens in a direction which increases the evaluation signal, the control unit is configured to transmit to the lens unit information about the drive direction of the focus lens as information corresponding to the second information.

7. The imaging apparatus according to claim 6, wherein, when the control unit determines the position of the focus lens where the evaluation signal is at its peak by means of the mountain-climbing driving, the control unit is configured to transmit to the lens unit information about the detected peak position as information corresponding to the first information in order to shift the focus lens to the peak position.

8. The imaging apparatus according to claim 1, wherein the imaging unit has a plurality of focus detection pixels that receive light fluxes each having passed through a different region of an exit pupil of the imaging optical system, the imaging apparatus further comprising:
  a focus detection unit configured to detect a defocus amount of an image plane by a phase difference detection method based on output signals obtained from the focus detection pixels,
  wherein, when the control unit generates drive information about the focus lens based on the detection results by the focus detection unit, the control unit transmits to the lens unit information about the defocus amount of an image plane detected by the focus detection unit as information corresponding to the second information.

9. A lens unit that is mountable to an imaging apparatus having an imaging unit configured to generate an imaging signal in synchronization with an output of a vertical synchronization signal, the lens unit comprising:
  an imaging optical system including a focus lens;
  a drive unit configured to drive the focus lens; and
  a lens control unit configured to communicate with the imaging apparatus to which the lens unit is mounted and to control driving of the drive unit based on drive information about the focus lens received from the imaging apparatus,
  wherein, when micro vibration of the focus lens is performed, the lens control unit is configured to receive from the imaging apparatus first information about a position of the focus lens to serve as a reference position for micro vibration and second information about an amount of movement of the focus lens indicated as a shift amount of an image plane with reference to the position of the focus lens corresponding to the first information, and to generate third information about the position of the focus lens to serve as an actual reference position for the micro vibration based on the first information and the second information, and to transmit the third information to the imaging apparatus,
  wherein the lens control unit is configured to receive the vertical synchronization signal from the imaging apparatus, and to communicate with the imaging apparatus twice during a time period from a time when a vertical synchronization signal is output to a time when a next vertical synchronization signal is output, and to transmit the third information based on the last first information and the second information to the imaging apparatus in a first communication, and to receive the next first information and the second information from the imaging apparatus in a second communication.

10. The lens unit according to claim 9, wherein the lens control unit transmits to the imaging apparatus fourth information about the position of the focus lens at time indicated in the second communication by the imaging apparatus.

11. The lens unit according to claim 9, wherein the lens control unit is configured to store information about ratio of the shift amount of the image plane to the drive amount of the focus lens, and to calculate the drive amount of the focus lens on the basis of the second information received from the imaging apparatus using the information about the ratio.

12. The lens unit according to claim 9, wherein the lens control unit is configured to receive from the imaging apparatus information indicating the shift amount of the image forming position of an object image with reference to the position of the focus lens corresponding to the first information as the second information.

13. A lens unit according to claim 9, wherein, when the lens control unit transmits to the imaging apparatus information about the position of the focus lens corresponding to an end of a movable region of the focus lens as fourth information, the lens control unit is configured to transmit to the imaging apparatus, along with the fourth information, information indicating that the position of the focus lens corresponding to the fourth information is an end of a movable region.

14. The lens unit according to claim 9 that is mountable to the imaging apparatus having a signal processing unit configured to generate an evaluation signal for focus adjustment using the imaging signal,
  wherein, when mountain-climbing driving is performed to drive the focus lens in a direction which increases the evaluation signal, the lens control unit is configured to set the drive direction of the focus lens based on the received information corresponding to the second information.

15. The lens unit according to claim 9, wherein the imaging means has a plurality of focus detection pixels for receiving light fluxes each having passed through a different region of an exit pupil of the imaging optical system, and the imaging apparatus further has a focus detection means arranged to detect a defocus amount of an image plane by a phase difference detection method based on output signals obtained from the focus detection pixels,
  wherein, when the lens control unit drives the focus lens based on the detection results by the focus detection unit, the lens control unit is configured to receive from the imaging apparatus information about the defocus amount of an image plane detected by the focus detection unit as information corresponding to the second information.

16. A control method executed by an imaging apparatus that is mountable to a lens unit provided with an imaging optical system including a focus lens, the method comprising:
  generating an imaging signal by photo-electrically converting an object image in synchronization with an output of a vertical synchronization signal;

generating an evaluation signal for focus adjustment using the imaging signal; and controlling to generate drive information about a focus lens based on the evaluation signal and to transmit the drive information to the mounted lens unit, wherein, when micro vibration of the focus lens is performed, in the controlling, first information about a position of the focus lens to serve as a reference position for micro vibration and second information about an amount of movement of the focus lens indicated as a shift amount of an image plane with reference to the position of the focus lens corresponding to the first information as the drive information are transmitted, and third information, which is generated by the lens unit based on the first information and the second information, about the position of the focus lens to serve as an actual reference position for the micro vibration is received, wherein, in the controlling, communication with the lens unit is performed twice during a time period from a time when the vertical synchronization signal is output to a time when a next vertical synchronization signal is output, wherein the third information based on the last first information and the second information is received from the lens unit in a first communication, and the next first information and the second information is transmitted to the lens unit in a second communication.

17. A control method executed by a lens unit that is mountable to an imaging apparatus having an imaging unit configured to generate an imaging signal in synchronization with an output of a vertical synchronization signal, and the lens unit comprises an imaging optical system including a focus lens and a drive unit configured to drive the focus lens, the method comprising:

communicating with the imaging apparatus to which the lens unit is mounted; and controlling driving of the drive unit based on drive information about the focus lens received from the imaging apparatus in the communicating, wherein, when micro vibration of the focus lens is performed, in the communicating, first information about a position of the focus lens to serve as a reference position for micro vibration and second information about an amount of movement of the focus lens indicated as a shift amount of an image plane with reference to the position of the focus lens corresponding to the first information are received from the imaging apparatus, third information about the position of the focus lens to serve as an actual reference position for the micro vibration based on the first information and the second information is generated, and the third information is transmitted to the imaging apparatus, wherein in the communicating, the vertical synchronization signal is received from the imaging apparatus, and communication with the imaging apparatus is performed twice during a time period from a time when a vertical synchronization signal is output to a time when a next vertical synchronization signal is output, wherein the third information based on the last first information and the second information is transmitted to the imaging apparatus in a first communication, and the next first information and the second information is received from the imaging apparatus in a second communication.

18. An imaging system comprising an imaging apparatus as claimed in claim 1 and a lens unit as claimed in claim 9.

* * * * *